United States Patent [19]
Ohtake

[11] Patent Number: 5,717,526
[45] Date of Patent: Feb. 10, 1998

[54] VARIABLE FOCAL LENGTH OPTICAL SYSTEM

[75] Inventor: Motoyuki Ohtake, Kawasaki, Japan

[73] Assignee: Nikon Corporation, Tokyo, Japan

[21] Appl. No.: 650,815

[22] Filed: May 20, 1996

[30] Foreign Application Priority Data

Jun. 19, 1995 [JP] Japan .................. 7-175529

[51] Int. Cl.⁶ .................. G02B 15/14
[52] U.S. Cl. .................. 359/683; 359/686
[58] Field of Search .................. 359/683, 676, 359/686, 687, 688

[56] References Cited

U.S. PATENT DOCUMENTS

| 5,126,883 | 6/1992 | Sato et al. | 359/683 |
| 5,532,881 | 7/1996 | Nakatsuji et al. | 359/683 |

FOREIGN PATENT DOCUMENTS

| 2-73211 | 3/1990 | Japan . |
| 3-39920 | 2/1991 | Japan . |
| 6-265787 | 9/1994 | Japan . |
| 7-27979 | 1/1995 | Japan . |

*Primary Examiner*—Scott J. Sugarman
*Attorney, Agent, or Firm*—Shapiro and Shapiro

[57] ABSTRACT

An optical system includes, in the following order from the object side, a first lens unit having a positive refractive power, a second lens unit having a negative refractive power, a third lens unit having a negative refractive power, a fourth lens unit having a positive refractive power, a fifth lens unit having a positive refractive power, and a sixth lens unit having a negative refractive power. At least the first and sixth lens units move toward the object side upon changing the focal length from the maximum wide-angle state to the maximum telephoto state in such a way that the gap between the first and second lens units increases, the gap between the third and fourth lens units decreases, and the gap between the fifth and sixth lens units decreases.

17 Claims, 18 Drawing Sheets

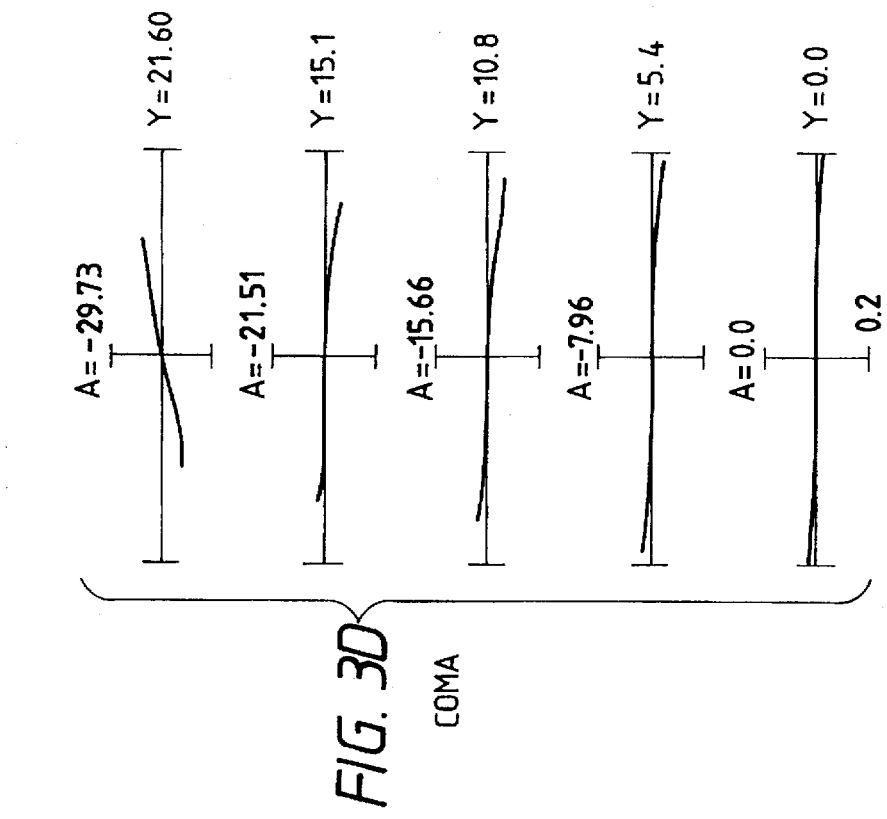
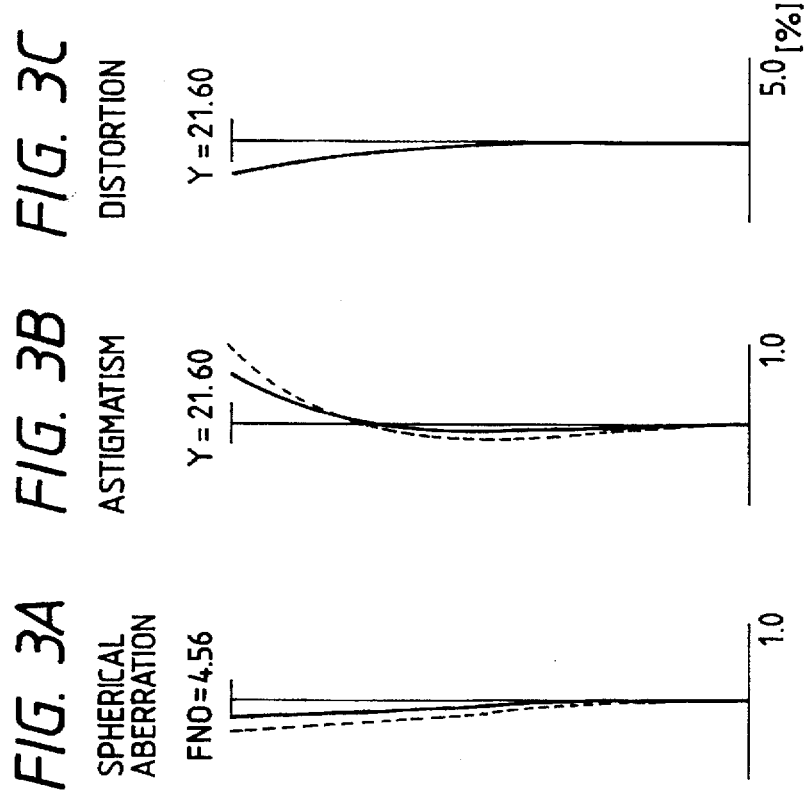

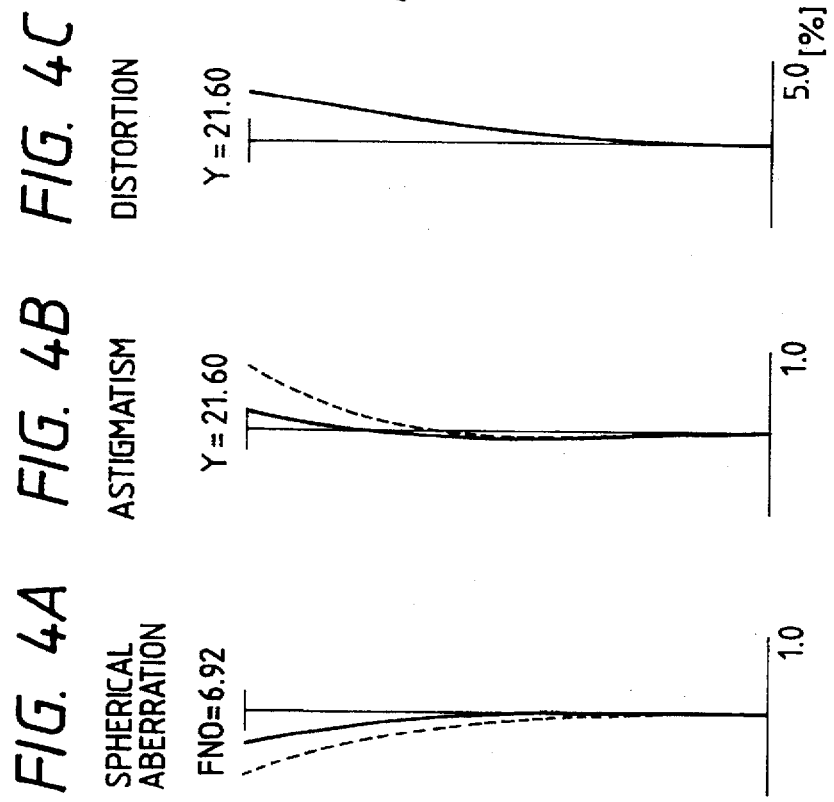

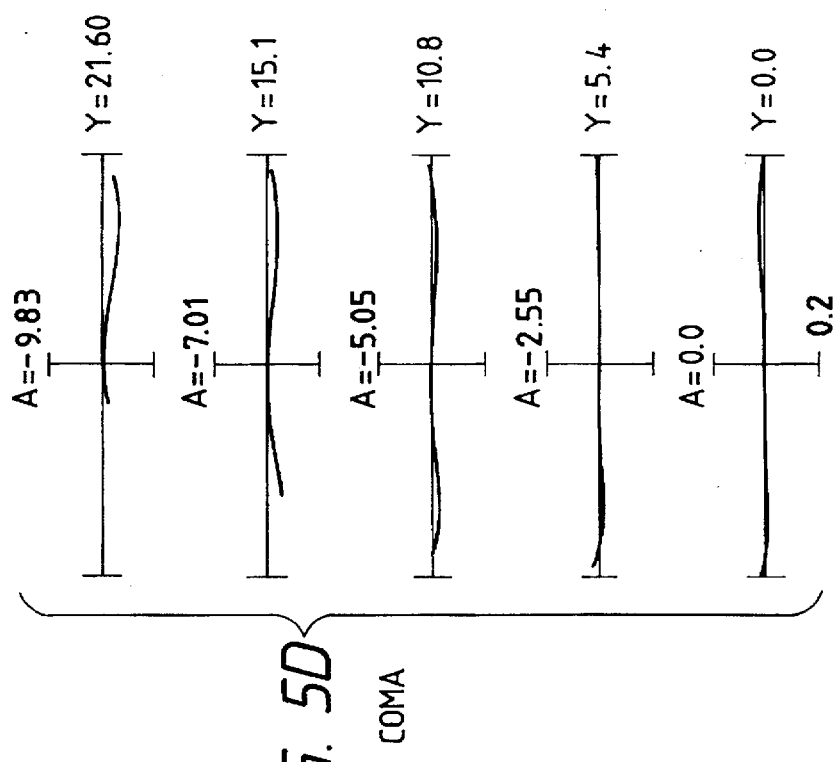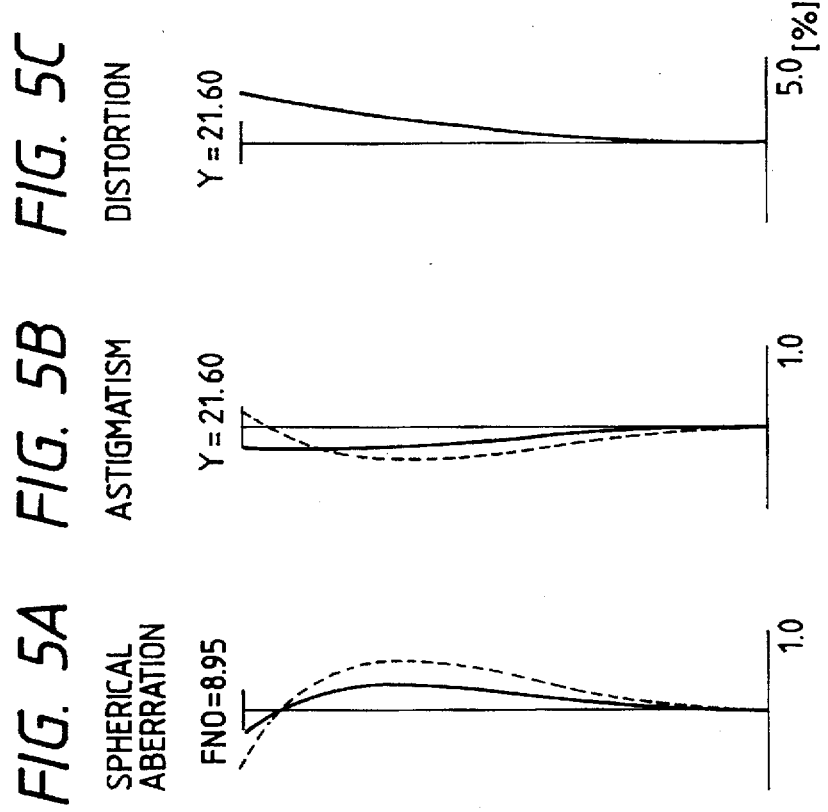

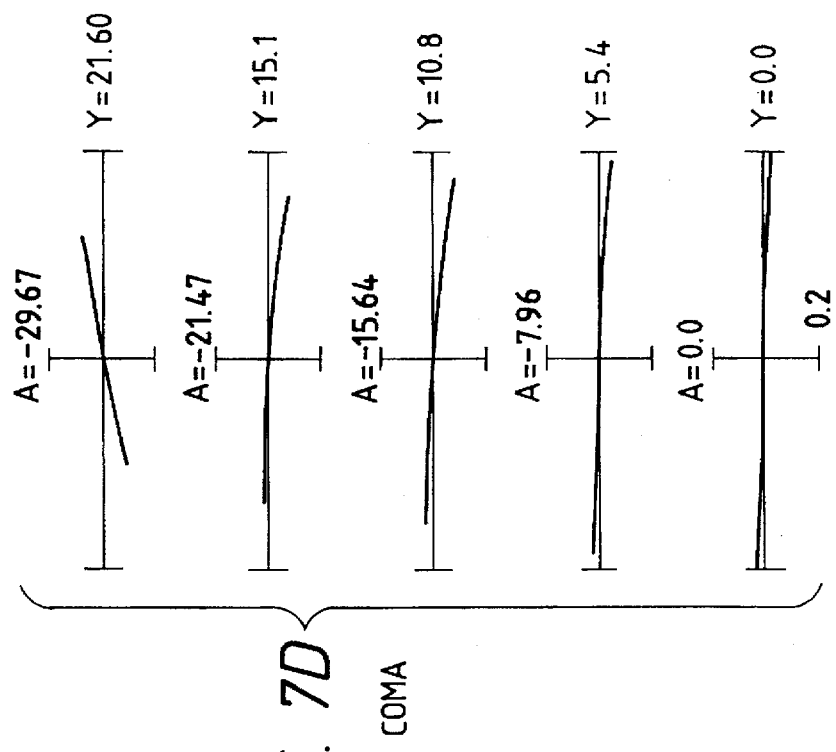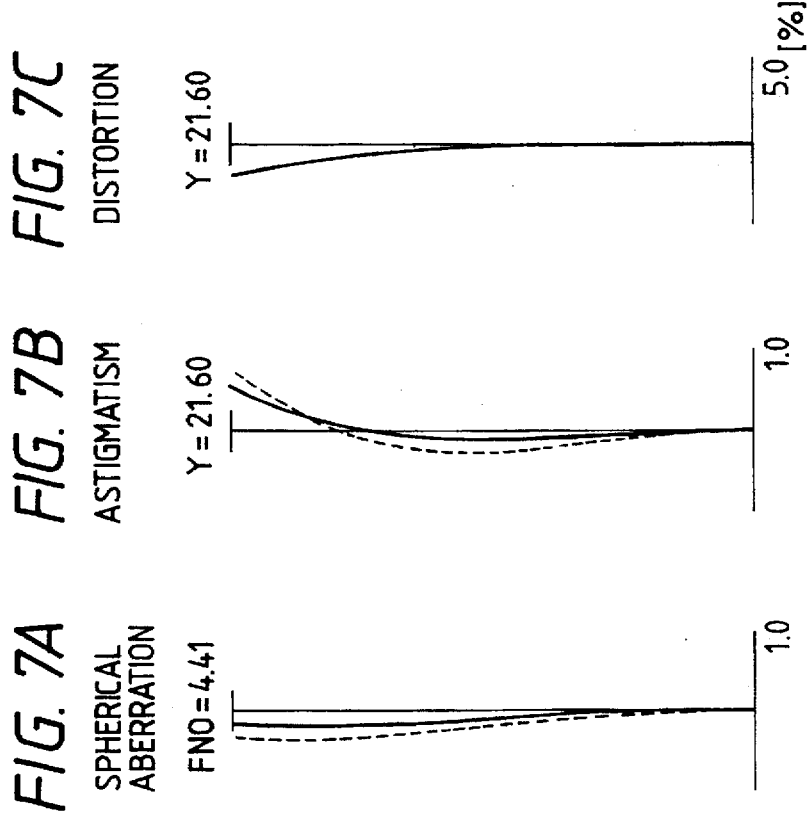

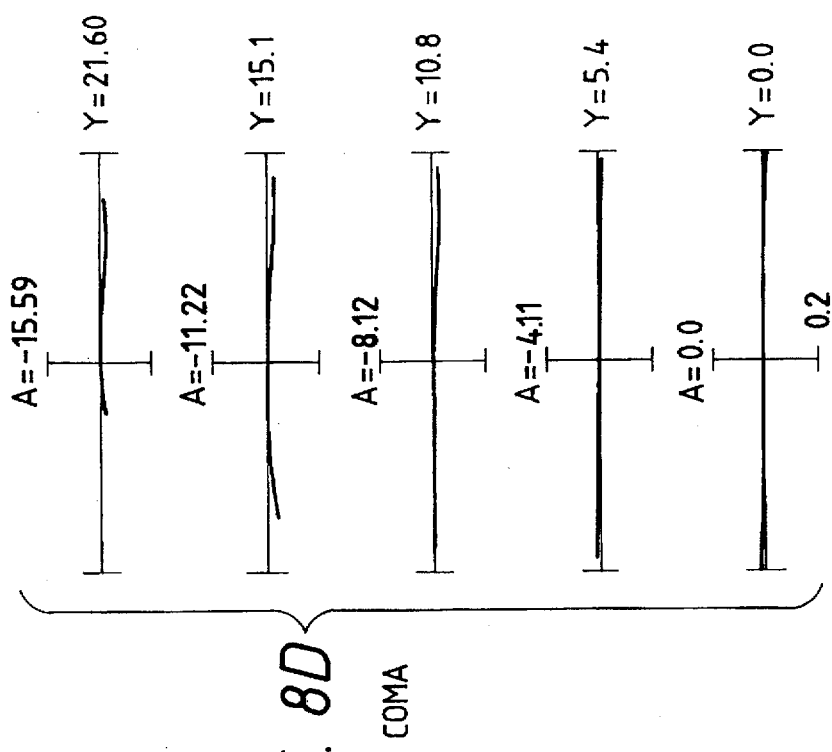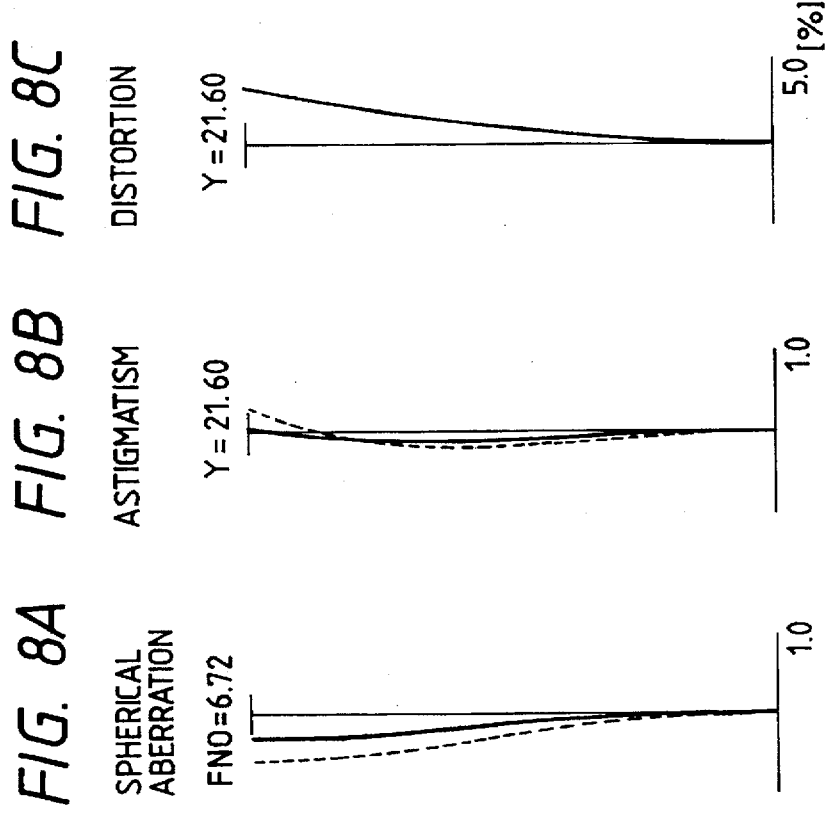

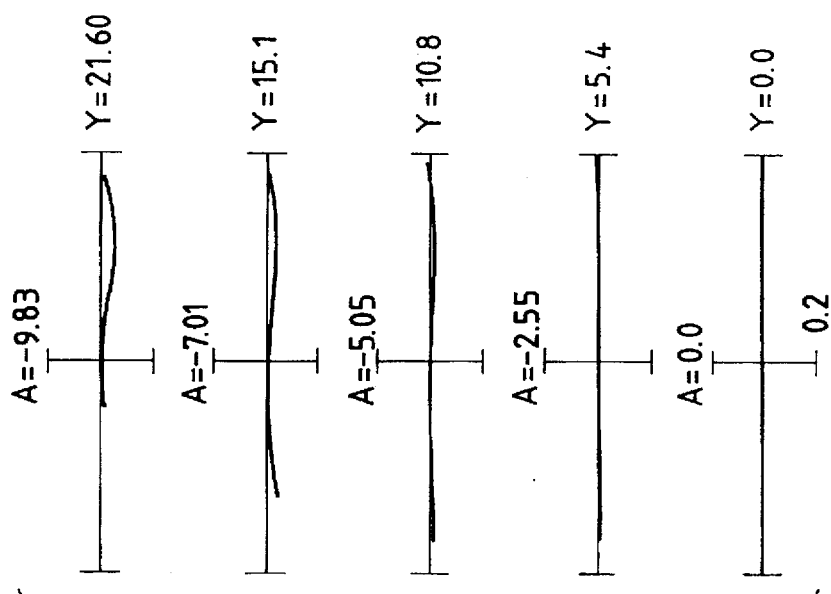
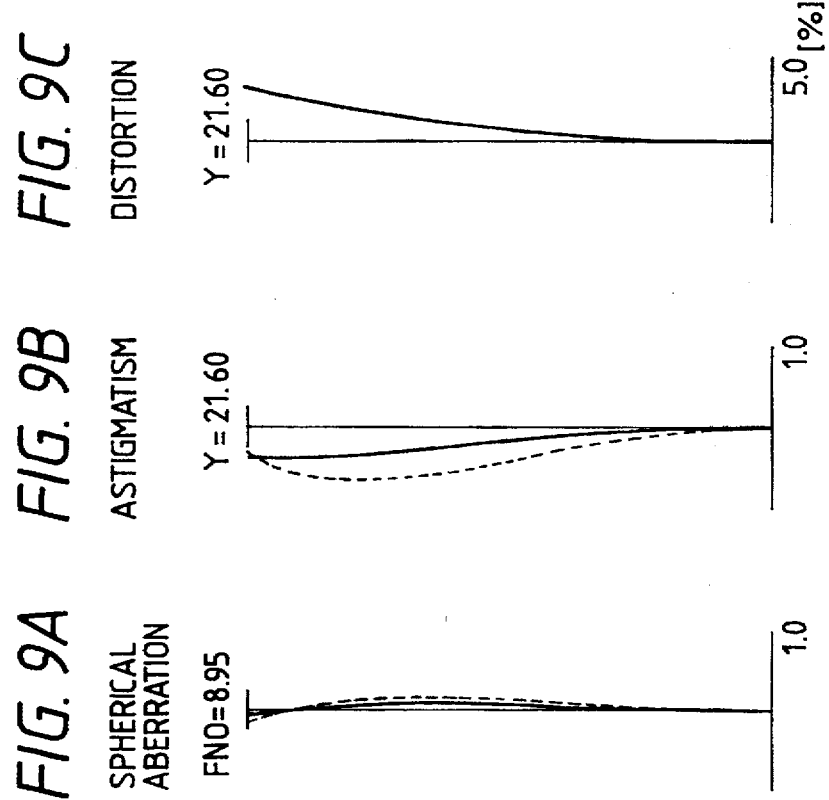

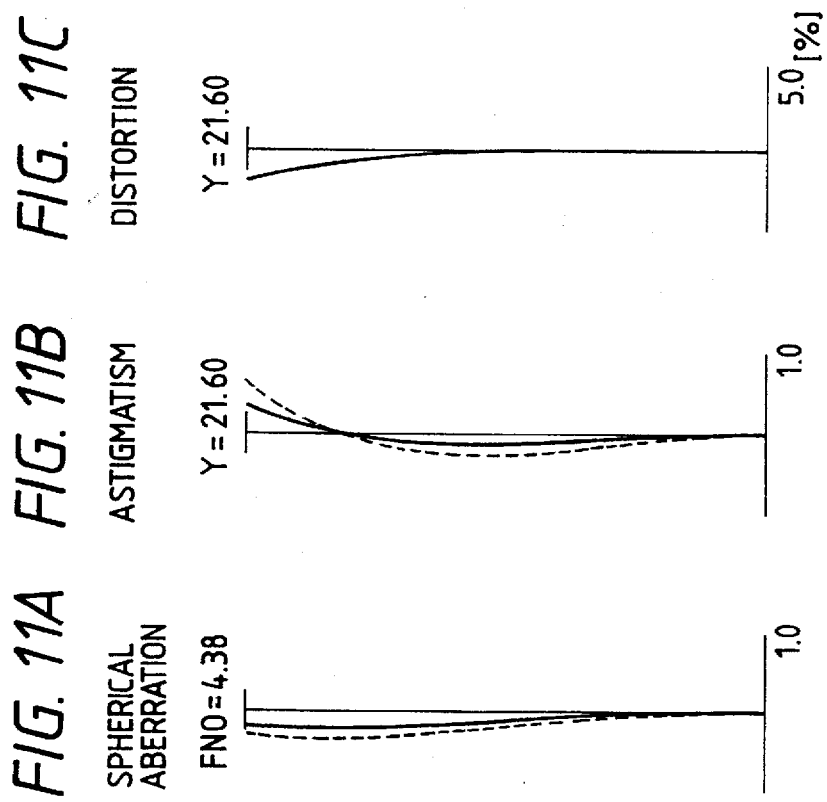

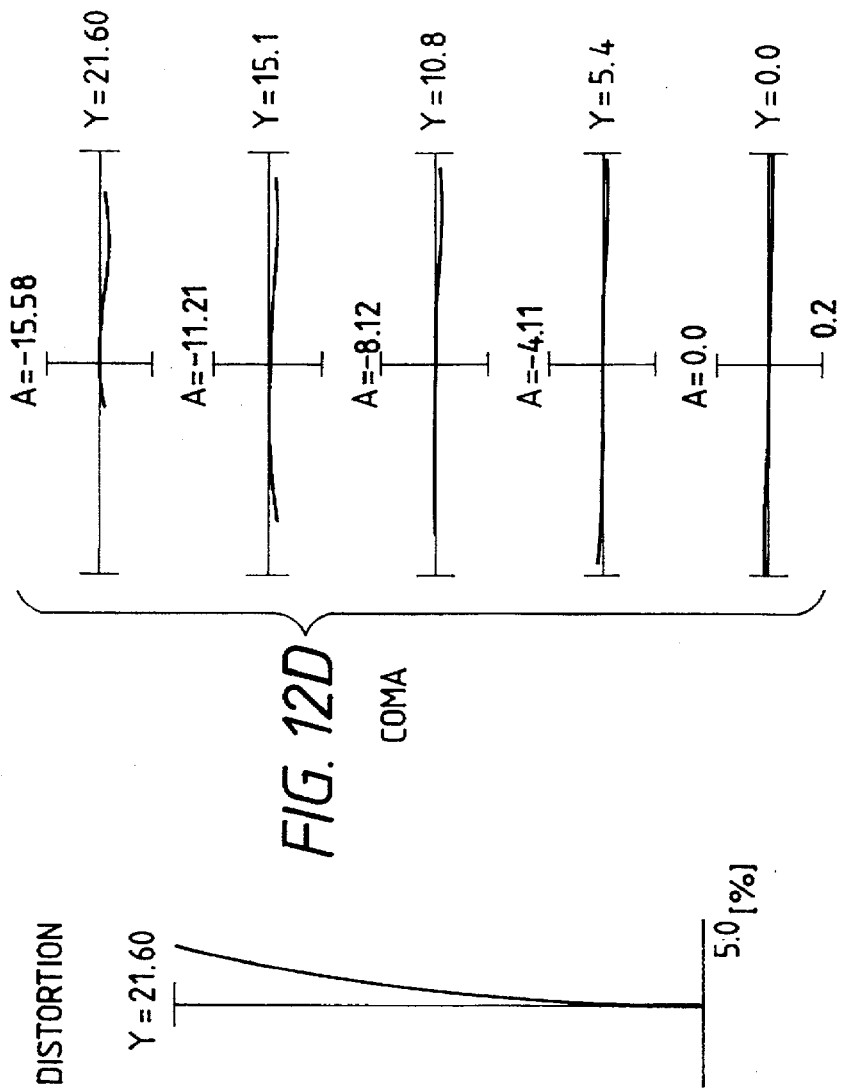
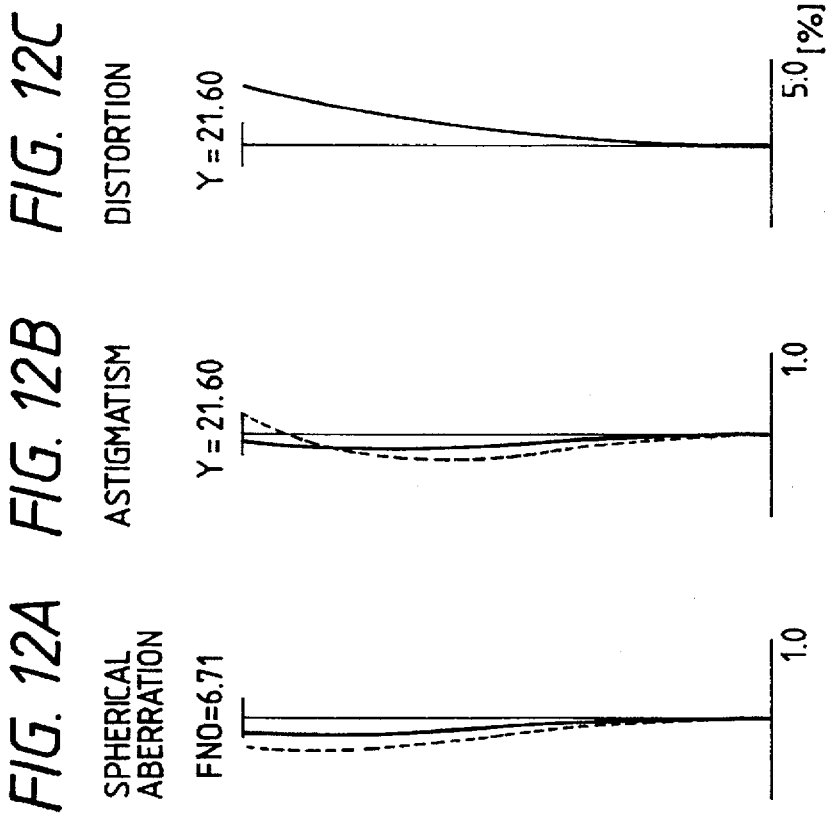

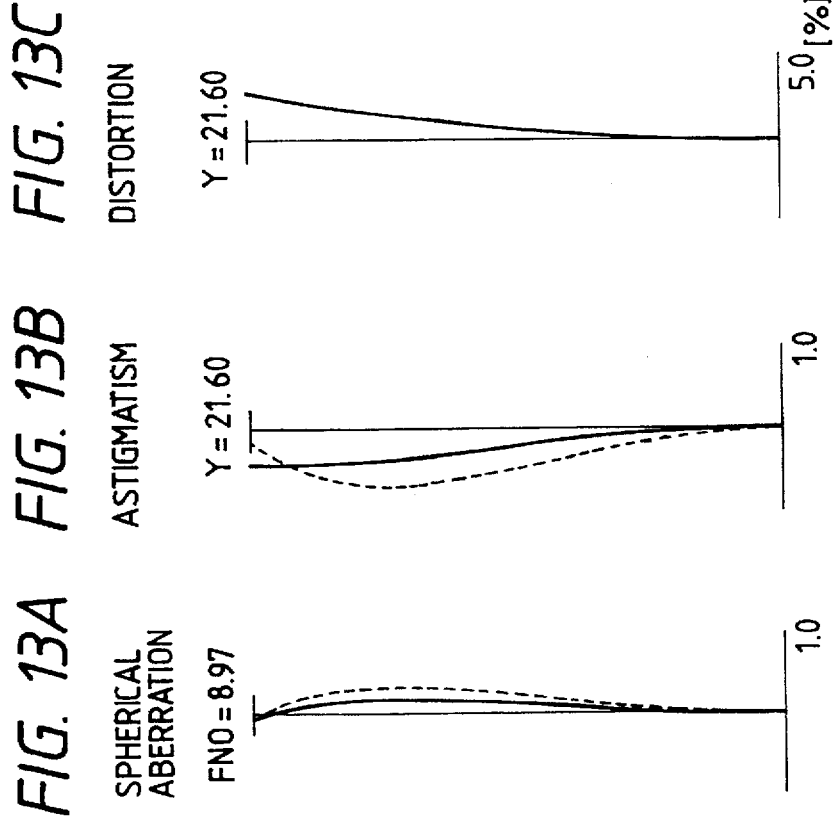

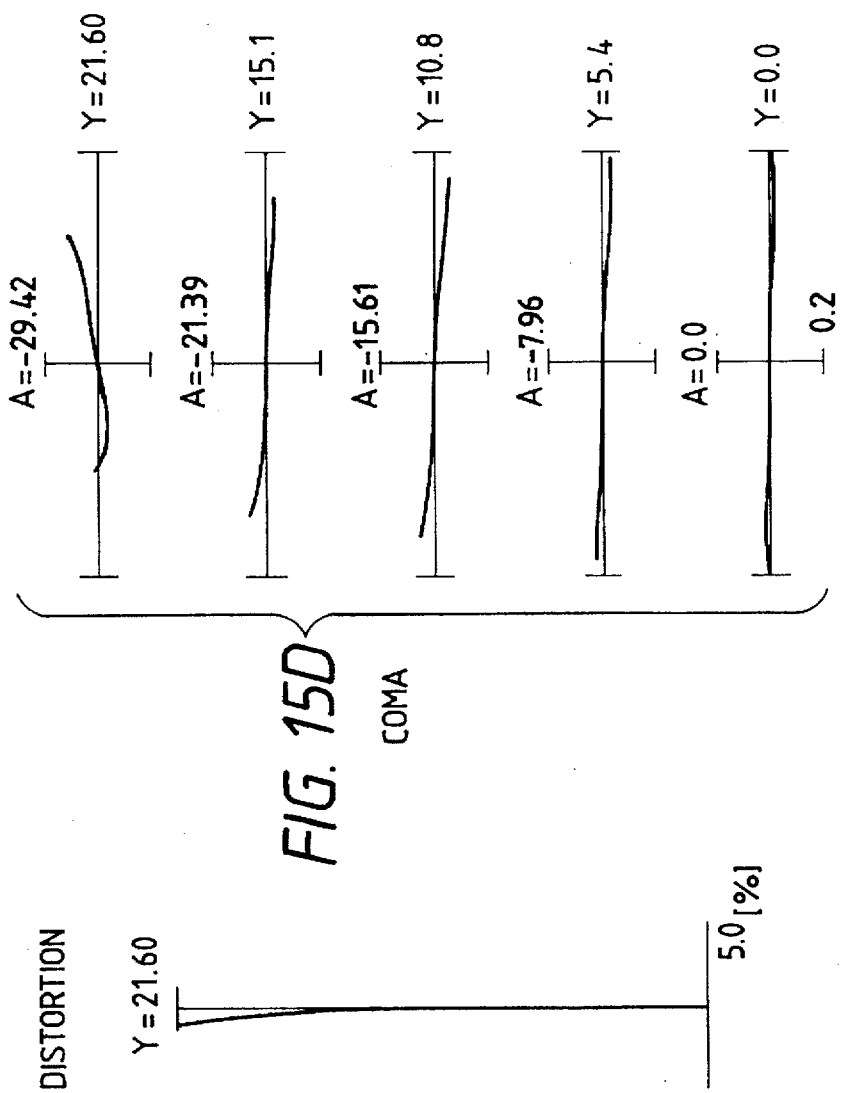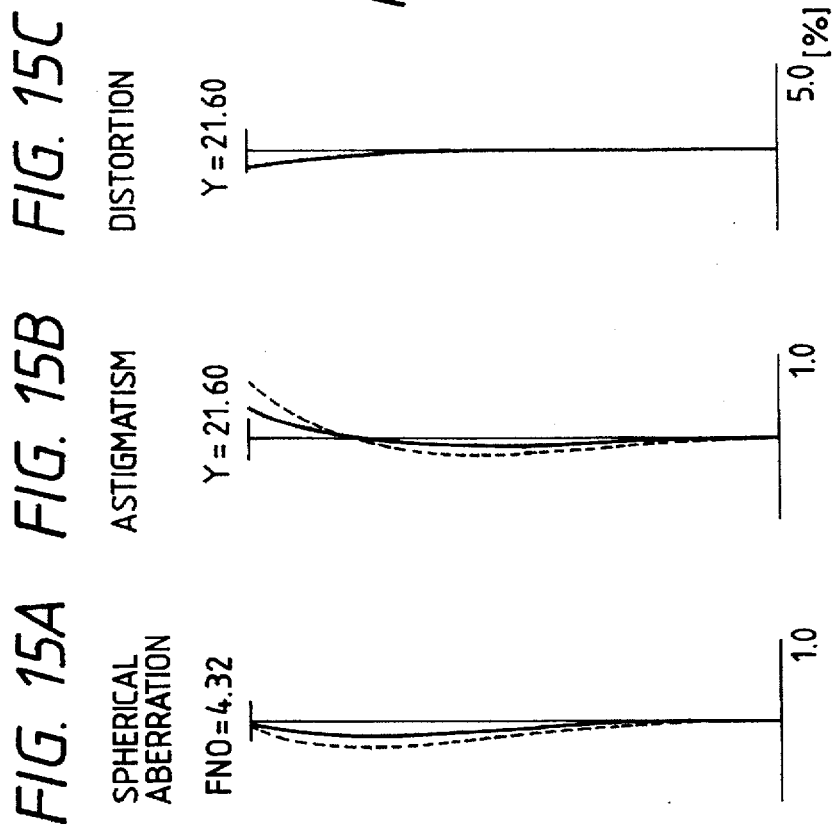

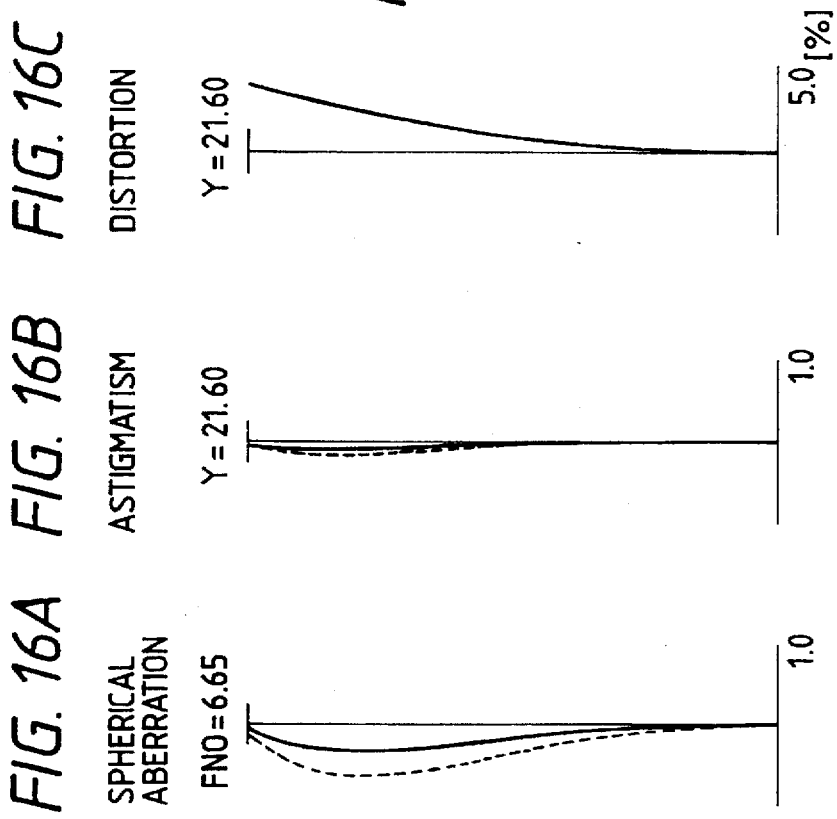

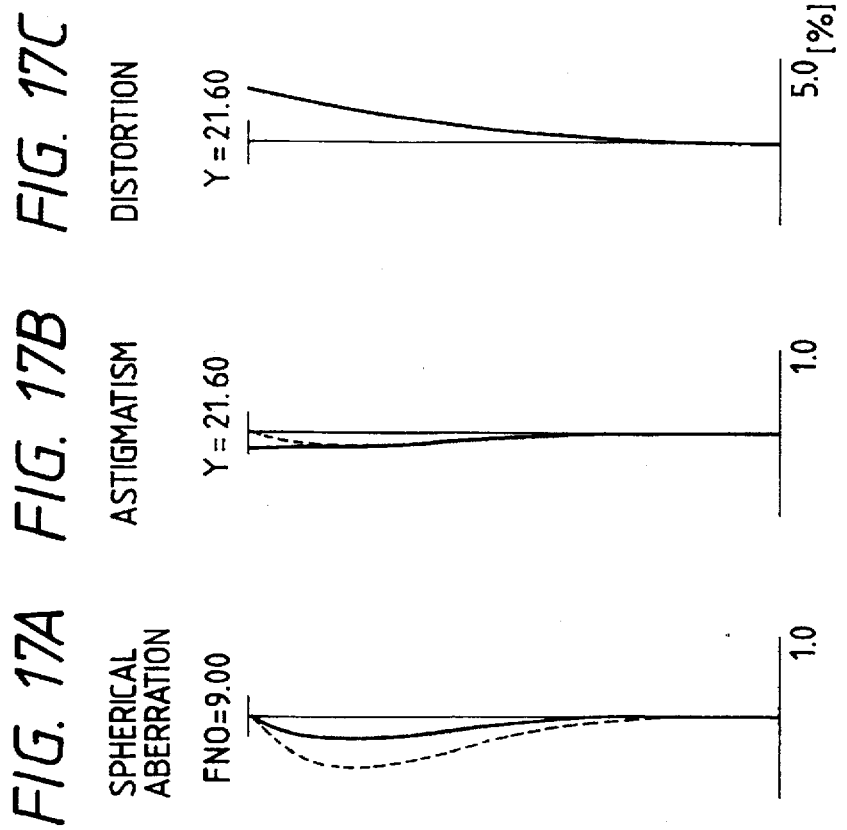

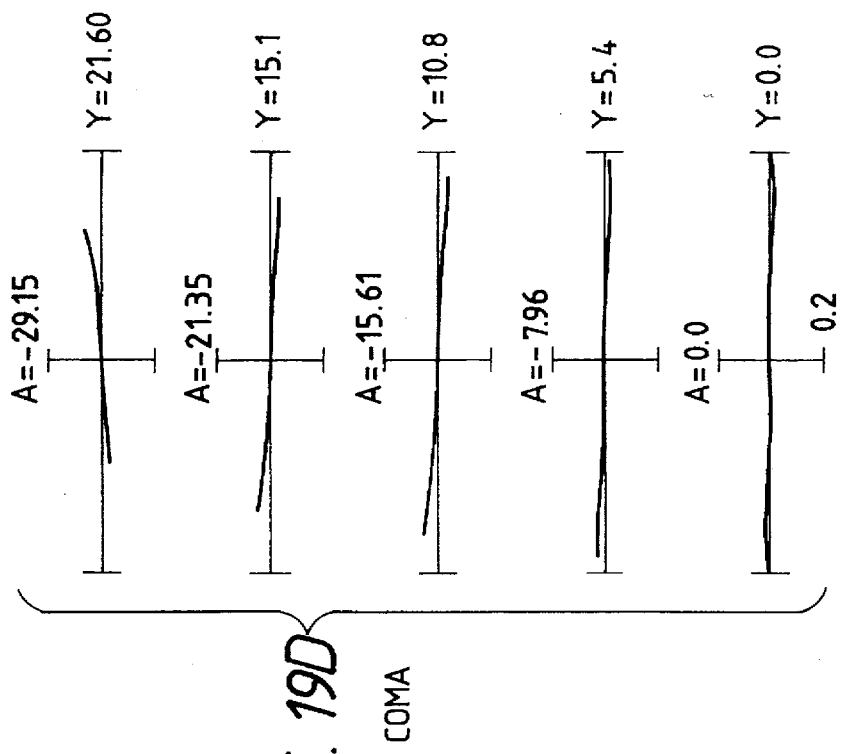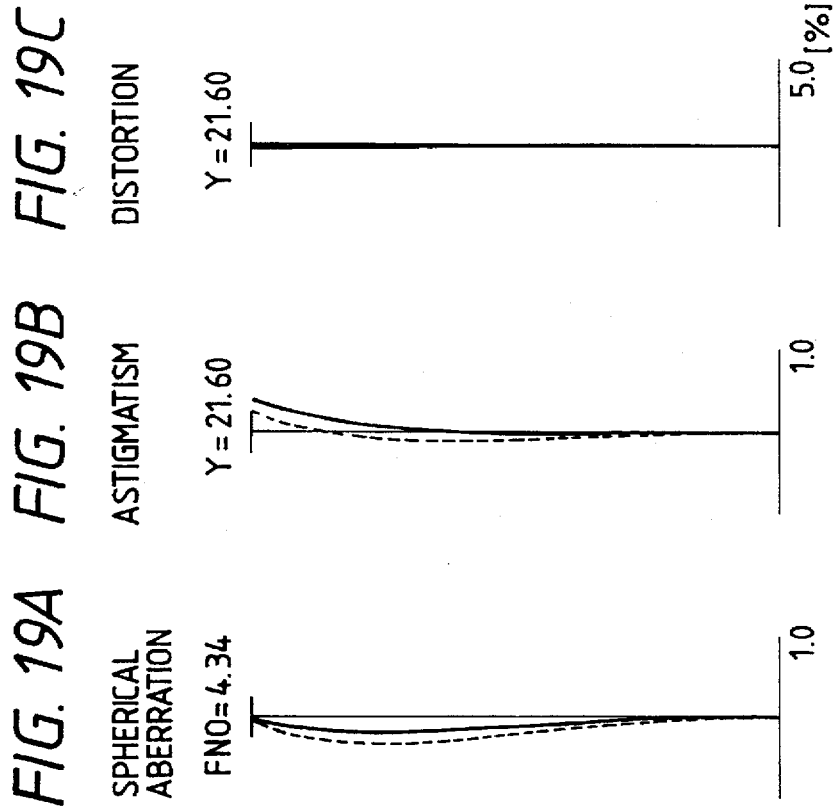

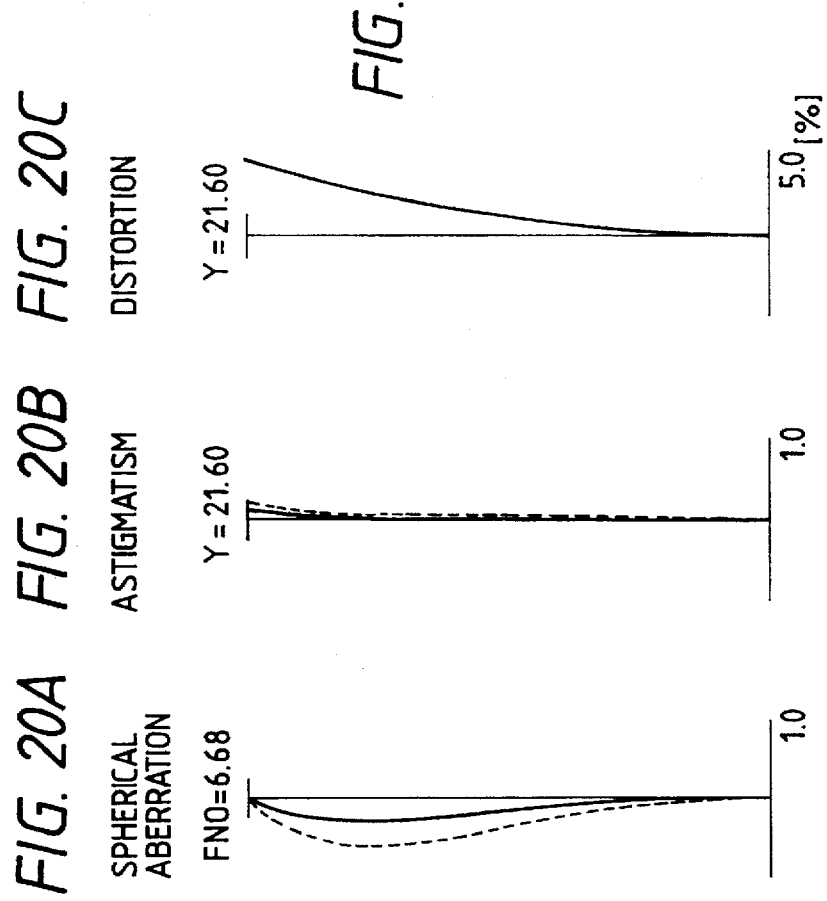

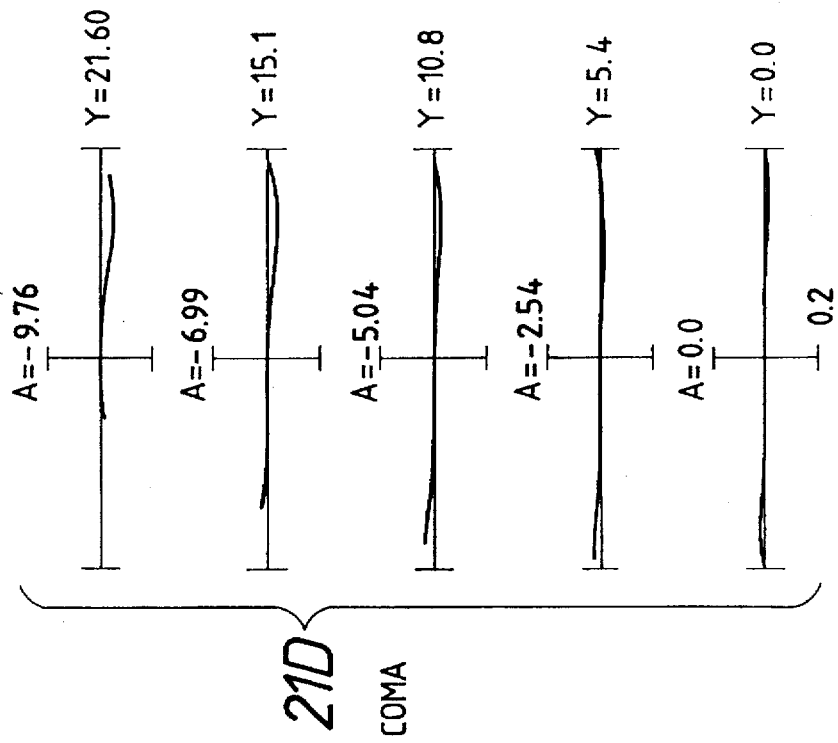
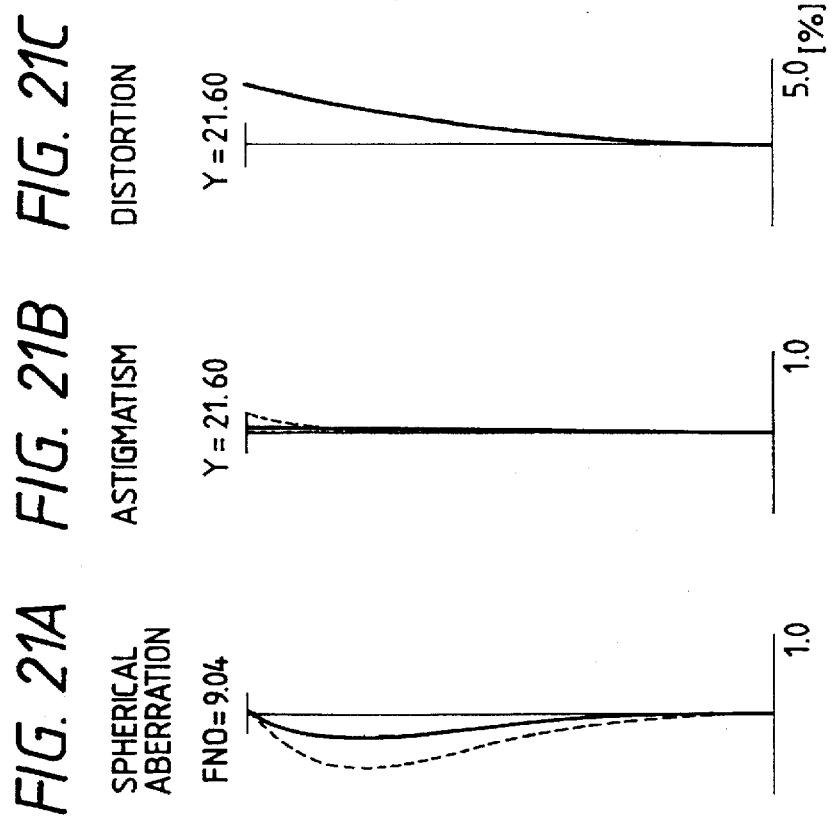

VARIABLE FOCAL LENGTH OPTICAL SYSTEM

BACKGROUND OF THE INVENTION

1. Field of the Invention

The present invention relates to a variable focal length optical system and, more particularly, to a variable focal length optical system which can attain a high zoom ratio.

2. Related Background Art

In recent years, zoom lenses have become popular as photographing lenses of lens-shutter cameras.

A lens-shutter camera has no limitation on the back focus since it has no mirror box. Therefore, various proposals have been made in association with a zoom type suitable for a size reduction. In particular, along with recent advances in the lens barrel manufacturing techniques, various zoom lenses that attain a high zoom ratio and high performance using a so-called multi-unit zoom lens constituted by three or more lens units have been proposed.

A general explanation about a multi-unit zoom lens will be given below.

In a multi-unit zoom lens, since the degrees of freedom of choice as to the loci of the respective lens units upon zooming from the maximum wide-angle state to the maximum telephoto state increase, the degree of freedom upon aberration correction increases. Since the number of lens units that move upon zooming (or focal length variation) increases, the degrees of contribution of the respective lens units to focal length variation can be easily uniformalized, thus attaining high performance while attaining a high zoom ratio. Furthermore, along with recent advances in the lens barrel manufacturing techniques, a problem associated with a complicated lens barrel structure caused by an increase in the number of movable portions has been overcome to some extent.

Conventionally, in a zoom lens suitable for a lens-shutter camera, in order to shorten the total lens length (distance between the frontmost lens surface and the image plane along the optical axis) or to reduce the diameters of the respective lenses, a lens unit closest to the image side is determined to be a negative lens unit. By increasing a change in back focus upon zooming from the maximum wide-angle state to the maximum telephoto state, efficient zooming can be attained while realizing a size reduction of the lens system.

More specifically, as multi-unit zoom lenses that can attain a high zoom ratio and are suitable for a size reduction, a 3-unit type zoom lens consisting of positive, positive, and negative lens units, a 4-unit type zoom lens consisting of positive, negative, positive, and negative lens units, a 5-unit type zoom lens consisting of positive, negative, positive, positive, and negative lens units, and the like are known, and various zoom lenses have been proposed so far.

The 3-unit type zoom lens (positive, positive, and negative lens units) is constituted by, in the following order from the object side, a first lens unit having a positive refractive power, a second lens unit having a positive refractive power, and a third lens unit having a negative refractive power. Upon zooming (i.e., changing the focal length of the lens system) from the maximum wide-angle state to the maximum telephoto state, the respective lens units move toward the object side, so that the air gap between the first and second lens units increases, and the air gap between the second and third lens units decreases (e.g., Japanese Patent Application Laid-Open No. 2-73211).

On the other hand, the 4-unit type zoom lens (positive, negative, positive, and negative lens units) is constituted by, in the following order from the object side, a first lens unit having a positive refractive power, a second lens unit having a negative refractive power, a third lens unit having a positive refractive power, and a fourth lens unit having a negative refractive power. Upon zooming from the maximum wide-angle state to the maximum telephoto state, the respective lens units move toward the object side, so that the air gap between the first and second lens units increases, the air gap between the second and third lens units decreases, and the air gap between the third and fourth lens units decreases (e.g., Japanese Patent Application Laid-Open No. 3-39920).

The 5-unit type zoom lens (positive, negative, positive, positive, and negative lens units) is constituted by, in the following order from the object side, a first lens unit having a positive refractive power, a second lens unit having a negative refractive power, a third lens unit having a positive refractive power, a fourth lens unit having a positive refractive power, and a fifth lens unit having a negative refractive power. Upon zooming from the maximum wide-angle state to the maximum telephoto state, the respective lens units move toward the object side, so that the air gap between the first and second lens units increases, the air gap between the second and third lens units decreases, the gap between the third and fourth lens units increases, and the gap between the fourth and fifth lens units decreases (e.g. Japanese Patent Application Laid-Open No. 7-27979).

In a lens-shutter camera, the lens system is stored (collapsed) in the camera body except during photographing operations. Therefore, in order to attain a size reduction of the camera body, a reduction of the lens diameters, a decrease in total lens length, and a decrease in lens thickness when the lens system is stored in the camera body (the length of the lens in its collapsed state) are required. At this time, a decrease in length along the optical axis between a surface closest to the object side to a surface closest to the image side of the lens system (total lens thickness) and a decrease in thickness of the respective lens units directly lead to a size reduction of the camera body.

However, in the 3-unit type zoom lens (positive, positive, and negative lens units) disclosed in Japanese Patent Application Laid-Open No. 2-73211, the variation in focal length of the entire lens system is mainly attained by the variation in magnification of the third lens unit. For this reason, when a high zoom ratio is to be attained, a variation in off-axis aberration generated in the third lens unit cannot be suppressed when changing the focal length of the entire lens system from the maximum wide-angle state to the maximum telephoto state.

The second lens unit is constituted by a lens unit $2a$ having a negative refractive power and a lens unit $2b$ which is arranged on the image side of the lens unit $2a$ and has a positive refractive power. Therefore, since the angle of incidence of an off-axis beam passing through the lens unit $2a$ upon zooming largely changes without changing its height, a variation in off-axis aberration becomes large. In this case, by increasing the number of constituting lenses or increasing the gap between the lens units $2a$ and $2b$, variations of various aberrations generated in the second lens unit upon zooming can be suppressed. However, in either case, the lens system becomes bulky.

The 4-unit type zoom lens (positive, negative, positive, and negative lens units) disclosed in Japanese Patent Application Laid-Open No. 3-39920 is suitable for attaining a high zoom ratio as compared to the 3-unit type zoom lens (positive, positive, and negative lens units) since it is constituted by four movable lens units. However, upon zooming, the angle of incidence of an off-axis beam entering the second lens unit largely changes with almost no change in height. For this reason, in order to attain a higher zoom ratio, a variation in off-axis aberration generated in the second lens unit upon zooming cannot be suppressed.

In the 4-unit type zoom lens (positive, negative, positive, and negative lens units) disclosed in Japanese Patent Application Laid-Open No. 6-265787, since an aspherical surface is used in the second lens unit, a high zoom ratio is attained while suppressing a variation in off-axis aberration generated upon zooming. However, since a change in lateral magnification of the second lens unit during zooming is large, performance considerably deteriorates due to decentering, and it is difficult to realize an acceptable lens system.

In the 5-unit type zoom lens (positive, negative, positive, positive, and negative lens units) disclosed in Japanese Patent Application Laid-Open No. 7-27979, contribution to variation in focal length of the lens system allotted to each of the lens units is decreased by increasing the number of movable lens units, and variations of various aberrations generated upon zooming can be satisfactorily suppressed. However, when the zoom ratio is further increased, a variation in off-axis aberration generated upon zooming becomes large, and it becomes difficult to attain high performance at the same time.

As described above, in a conventional multi-unit zoom lens suitable for a lens-shutter camera, it is difficult to attain high performance while realizing a size reduction and a high zoom ratio. When the zoom ratio is to be further increased with a small number of lenses, a requirement for variation in magnification allotted to each of the lens unit increases, and hence, it is difficult to satisfactorily correct variations of various aberrations upon changing the focal length from the maximum wide-angle state to the maximum telephoto state.

SUMMARY OF THE INVENTION

The present invention has been made in consideration of the above situation and has as its object to provide a variable focal length optical system which can attain both a high zoom ratio and high performance while attaining a size reduction.

In order to achieve the above object, according to the present invention, there is provided a variable focal length optical system comprising, in the following order from the object side: a first lens unit G1 having a positive refractive power; a second lens unit G2 having a negative refractive power; a third lens unit G3 having a negative refractive power; a fourth lens unit G4 having a positive refractive power; a fifth lens unit G5 having a positive refractive power; and a sixth lens unit G6 having a negative refractive power, wherein at least the first and sixth lens units G1 and G6 move toward the object side when the length of the lens system is varied from a maximum wide-angle state to a maximum telephoto state in such a way that a gap between the first and second lens units G1 and G2 increases, a gap between the third and fourth lens units G3 and G4 decreases, and a gap between the fifth and sixth lens units G5 and G6 decreases.

According to a preferred mode of the present invention, the variable focal length optical system satisfies:

$$0.4 < (\beta 6t/\beta 6w)/(ft/fw) < 0.8$$

where $\beta 6t$ is the lateral magnification of the sixth lens unit G6 in the maximum telephoto state, $\beta 6w$ is the lateral magnification of the sixth lens unit G6 in the maximum wide-angle state, fw is the focal length of the entire optical system in the maximum wide-angle state, and ft is the focal length of the entire optical system in the maximum telephoto state.

According to another aspect of the present invention, there is provided a variable focal length optical system comprising: a lens unit Ga; a lens unit Gb arranged on the image side of the lens unit Ga; a lens unit Gc arranged on the image side of the lens unit Gb; and a lens unit Gd arranged on the image side of the lens unit Gc, wherein when the focal length of the lens system is varied from a maximum wide-angle state to a maximum telephoto state, the lens units Ga and Gd move integrally, and the lens units Gb and Gc move at different speeds.

Conventionally, in a zoom lens suitable for a lens-shutter camera, it is effective to arrange a negative lens unit at a position closest to the image side so as to shorten the total lens length. Therefore, in the present invention, the sixth lens unit G6 arranged at the position closest to the image side has a negative refractive power. In order to range a wider angle, the back focus in the maximum wide-angle state is shortened to some extent to separate the height of an off-axis light flux passing through the sixth lens unit G6 from the optical axis, thereby independently correcting on-axis and off-axis aberrations.

On the other hand, since a large change in back focus during focal length variation is assured, the height of an off-axis light flux passing through the sixth lens unit G6 in the maximum telephoto state becomes closer to the optical axis than that in the maximum wide-angle state. As a result, a change in height of the off-axis light flux passing through the sixth lens unit G6 during focal length variation becomes large, and a variation in off-axis aberration generated in the sixth lens unit G6 upon variation in focal length can be suppressed.

In the present invention, the first lens unit G1 having a positive refractive power is arranged at the position closest to the object side, and moves toward the object side upon variation in focal length from the maximum wide-angle state to the maximum telephoto state. In this manner, an off-axis light flux passing through the first lens unit G1 in the maximum wide-angle state is brought close to the optical axis, thereby attaining a size reduction of the lens system.

In the maximum telephoto state, the respective lens units move toward the object side to increase the gap between the first and second lens units G1 and G2, thereby shortening the total lens length.

Furthermore, in the present invention, four movable lens units, i.e., the second to fifth lens units G2 to G5 are arranged between the first and sixth lens units G1 and G6. In this manner, a variation in off-axis aberration generated upon attaining a high zoom ratio is suppressed while the requirements of aberration correction imposed on the respective lens units are reduced, and while the number of constituting lenses in each lens unit is reduced.

The arrangements of the four movable lens units, i.e., the second to fifth lens units G2 to G5, will be described below.

In the present invention, the second to fifth lens units G2 to G5 always have a positive synthetic refractive power during zooming. Of the second to fifth lens units G2 to G5, the second and third lens units G2 and G3 arranged on the object side have a negative refractive power, and the fourth and fifth lens units G4 and G5 arranged on the image side have a positive refractive power.

In the maximum wide-angle state, the second and third lens units G2 and G3 having a negative refractive power are arranged on the object side in the lens system, so that the first to third lens units G1 to G3 have a strong negative synthetic refractive power. In this manner, positive distortion is satisfactorily corrected, and a sufficient back focus is assured, thus reducing the lens diameters. The fourth and fifth lens units G4 and G5 having a positive refractive power are arranged to be close to each other so as to obtain a strong positive refractive power. On the other hand, the gap between the fifth and sixth lens units G5 and G6 is increased so that the refractive powers of the fourth and fifth lens units G4 and G5 do not become large in positive direction extremely.

Conversely, the gap between the second and third lens units G2 and G3 is increased and so is the air gap between the fourth and fifth lens units G4 and G5. In addition, the gap between the synthetic principal point of the second and third lens units G2 and G3 and the synthetic principal point of the fourth and fifth lens units G4 and G5 is decreased.

When the gap between two negative lens units is increased, the resulting synthetic refractive power becomes negative and strong. On the other hand, when the gap between two positive lens units is increased, the obtained synthetic refractive power becomes positive and weak. Furthermore, when the gap between a negative lens arranged on the object side and a positive lens unit arranged on the image side is increased, the synthetic refractive power becomes positive and strong if it is positive.

Therefore, in the present invention, the synthetic refractive power of the second and third lens units G2 and G3 in the maximum telephoto state becomes negative and weaker than that in the maximum wide-angle state, and the synthetic refractive power of the fourth and fifth lens units G4 and G5 in the maximum telephoto state becomes positive and weaker than that in the maximum wide-angle state. As a result, the synthetic refractive power of the second to fifth lens units G2 to G5 in the maximum telephoto state becomes positive and weaker than that in the maximum wide-angle state. As described above, a high zoom ratio is realized by positively performing focal length variation by the second to fifth lens units G2 to G5.

As described above, the variable focal length optical system of the present invention comprises, in the following order from the object side, the first lens unit G1 having a positive refractive power, the second lens unit G2 having a negative refractive power, the third lens unit G3 having a negative refractive power, the fourth lens unit G4 having a positive refractive power, the fifth lens unit G5 having a positive refractive power, and the sixth lens unit G6 having a negative refractive power. When the focal length of the lens system is varied from the maximum wide-angle state to the maximum telephoto state, at least the first and sixth lens units G1 and G6 move toward the object side, so that the gap between the first and second lens units G1 and G2 increases, and the gap between the fifth and sixth lens units G5 and G6 decreases, thus attaining a high zoom ratio and high performance although the system has a compact structure and a relatively small number of constituting lenses.

Conditional formulas of the present invention will be described below.

It is preferable that the variable focal length optical system of the present invention satisfy conditional formula (1) below:

$$0.4 < (\beta 6t/\beta 6w)/(ft/fw) < 0.8 \tag{1}$$

where $\beta 6t$: the lateral magnification of the sixth lens unit G6 in the maximum telephoto state $\beta 6w$: the lateral magnification of the sixth lens unit G6 in the maximum wide-angle state fw: the focal length of the entire optical system in the maximum wide-angle state ft: the focal length of the entire optical system in the maximum telephoto state.

Conditional formula (1) is one that defines the ratio of the contribution of the magnification variation of the sixth lens unit G6 to the focal length variation of the entire lens system, i.e., one that attains both a size reduction of the lens system and a high zoom ratio.

When $(\beta 6t/\beta 6w)/(ft/fw)$ exceeds the upper limit of conditional formula (1), the ratio of the contribution of the magnification variation of the sixth lens unit G6 to the focal length variation of the entire lens system becomes too large, and it becomes difficult to suppress a variation in off-axis variation generated in the sixth lens unit G6 upon zooming.

Conversely, when $(\beta 6t/\beta 6w)/(ft/fw)$ is smaller than the lower limit value of conditional formula (1), the ratio of the contribution of the magnification variation of the sixth lens unit G6 to the focal length variation of the entire lens system becomes too small, and the ratio of the contribution of the magnification variation of the second to fifth lens units G2 to G5 becomes too large to obtain a predetermined zoom ratio. For this reason, it becomes difficult to attain a simple arrangement of the second to fifth lens units G2 to G5, resulting in a large lens system.

In order to attain a further size reduction and simple arrangement, the lower limit value of conditional formula (1) is preferably set to be 0.5.

In the present invention, the variable focal length optical system preferably satisfies conditional formula (2) below:

$$0.9 < f1/(fw \cdot ft)^{1/2} < 1.3 \tag{2}$$

where f1: the focal length of the first lens unit G1.

Conditional formula (2) is one that defines the focal length of the first lens unit G2, i.e., one that attains a good balance between decreasing the total lens length in the maximum telephoto state and decreasing the lens diameter of the first lens unit G1.

When $f1/(fw \cdot ft)^{1/2}$ exceeds the upper limit value of conditional formula (2), since the focal length of the first lens unit G1 becomes positive and large, an off-axis light flux passing through the first lens unit G1 approaches the optical axis in the maximum wide-angle state. As a result, the lens diameter of the first lens unit G1 can be decreased, but the total lens length in the maximum telephoto state undesirably increases.

Conversely, when $f1/(fw \cdot ft)^{1/2}$ is smaller than the lower limit value of conditional formula (2), the total lens length in the maximum telephoto state can be decreased, but an off-axis light flux passing through the first lens unit G1 is separated away from the optical axis in the maximum wide-angle state. For this reason, it becomes impossible to decrease the lens diameter of the first lens unit G1.

In order to further decrease the total lens length in the maximum telephoto state, the upper limit value of conditional formula (2) is preferably set to be 1.2.

In the present invention, the variable focal length optical system preferably satisfies conditional formulas (3) and (4) below:

$$0 < (D23T - D23W) \cdot fw/(f2 \cdot f3) < 0.1 \tag{3}$$

$$0 < (D45T - D45W) \cdot fw/(f4 \cdot f5) < 0.3 \tag{4}$$

where

D23W: the on-axis air gap between the second and third lens units G2 and G3 in the maximum wide-angle state D23T: the on-axis air gap between the second and third lens units G2 and G3 in the maximum telephoto state D45W: the on-axis air gap between the fourth and fifth lens units G4 and G5 in the maximum wide-angle state D45T: the on-axis air gap between the fourth and fifth lens units G4 and G5 in the maximum telephoto state f2: the focal length of the second lens unit G2 f3: the focal length of the third lens unit G3 f4: the focal length of the fourth lens unit G4 f5: the focal length of the fifth lens unit G5.

Conditional formula (3) is one that defines the amount of change in synthetic refractive power of the second and third lens units G2 and G3.

Let $\phi 2$ be the refractive power of the second lens unit G2, $\phi 3$ be the refractive power of the third lens unit G3, and dw and dt respectively be the principal point intervals between the second and third lens units G2 and G3 in the maximum wide-angle and telephoto states. Then, synthetic refractive powers $\phi 23w$ and $\phi 23t$ in the maximum wide-angle and telephoto states are respectively given by the following formulas (a) and (b):

$$\phi 23w = \phi 2 + \phi 3 - \phi 2 \cdot \phi 3 \cdot dw \qquad (a)$$

$$\phi 23t = \phi 2 + \phi 3 - \phi 2 \cdot \phi 3 \cdot dt \qquad (b)$$

The amount, $\Delta D23$, of change in on-axis air gap between the second and third lens units G2 and G3 between the maximum wide-angle and telephoto states is given by formula (c) below:

$$\Delta D23 = (D23T - D23W) = dt - dw \qquad (c)$$

Furthermore, the difference, $\Delta\phi 23$, between the synthetic refractive powers of the second and third lens units G2 and G3 between the maximum wide-angle and telephoto states is given by formula (d) below:

$$\Delta\phi 23 = \phi 23w - \phi 23t = \phi 2 \cdot \phi 3 \cdot \Delta D23 \qquad (d)$$

Therefore, conditional formula (3) can be modified as formula (e) below:

$$0 < fw/\Delta\phi 23 < 0.1 \qquad (e)$$

When $(D23T-D23W) \cdot fw/(f2 \cdot f3)$ exceeds the upper limit value of conditional formula (3), since the synthetic refractive power $\phi 23t$ of the second and third lens units G2 and G3 in the maximum telephoto state becomes negative and large, the total lens length cannot be decreased in the maximum telephoto state.

Conversely, when $(D23T-D23W) \cdot fw/(f2 \cdot f3)$ is smaller than the lower limit value of conditional formula (3), the ratio of the contribution of the magnification variation of the second and third lens units G2 and G3 to the focal length variation becomes too small and the contribution of the magnification variation cannot be made uniform. Therefore, when a predetermined zoom ratio is to be obtained, it becomes difficult to suppress variations of various aberrations due to zooming, especially, a variation in off-axis variation.

Conditional formula (4) is one that defines the amount of change in synthetic refractive power of the fourth and fifth lens units G4 and G5.

When $(D45T-D45W) \cdot fw/(f4 \cdot f5)$ exceeds the upper limit value of conditional formula (4), the synthetic refractive power of the fourth and fifth lens units G4 and G5 becomes positive and large extremely in the maximum wide-angle state. As a result, since a sufficient back focus cannot be obtained and an off-axis light flux passing through the sixth lens unit G6 is separated away from the optical axis, the lens diameter cannot be decreased.

Conversely, when $(D45T-D45W) \cdot fw/(f4 \cdot f5)$ is smaller than the lower limit value of conditional formula (4), the ratio of the contribution of the magnification variation of the fourth and fifth lens units G4 and G5 to the focal length variation becomes too small, and the contribution of the magnification variation cannot be made uniform. Therefore, when a predetermined zoom ratio is to be obtained, a variation in off-axis aberration generated in the fourth and fifth lens units G4 and G5 upon zooming cannot be suppressed.

In the present invention, in order to cause the fourth and fifth lens units G4 and G5 to more positively contribute to the focal length variation of the lens system, the lower limit value of conditional formula (4) is preferably set to be 0.05.

From another aspect, the variable focal length optical system of the present invention includes the lens unit Ga (corresponding to the second lens unit G2), the lens unit Gb (corresponding to the third lens unit G3) arranged on the image side of the lens unit Ga, the lens unit Gc (corresponding to the fourth lens G4) arranged on the image side of the lens unit Gb, and the lens unit Gd (corresponding to the fifth lens unit G5) arranged on the image side of the lens unit Gc. Upon zooming from the maximum wide-angle state to the maximum telephoto state, the lens unit Ga (second lens unit G2) and the lens unit Gd (fifth lens unit G5) move integrally, and the lens unit Gb (third lens unit G3) and the lens unit Gc (fourth lens unit G4) move at different speeds (independently).

It is preferable that an aperture stop S be arranged near the center of the lens system (from the surface closest to the object side to the surface closest to the image side). In particular, the aperture stop S is preferably arranged between the second and third lens units G2 and G3, between the third and fourth lens units G3 and G4, or between the fourth and fifth lens units G4 and G5.

Furthermore, in the present invention, when a certain lens surface is an aspherical surface, a higher zoom ratio, higher performance, and a larger aperture can be attained, needless to say.

Upon focusing, by moving some lens units of the lens system, good imaging performance can be obtained from an infinity object to a closest-distance object.

BRIEF DESCRIPTION OF THE DRAWINGS

FIGS. 3A to 3D are graphs showing various aberrations in the maximum wide-angle state of the first embodiment;

FIGS. 4A to 4D are graphs showing various aberrations in the middle focal length state of the first embodiment;

FIGS. 5A to 5D are graphs showing various aberrations in the maximum telephoto state of the first embodiment;

FIGS. 7A to 7D are graphs showing various aberrations in the maximum wide-angle state of the second embodiment;

FIGS. 8A to 8D are graphs showing various aberrations in the middle focal length state of the second embodiment;

FIGS. 9A to 9D are graphs showing various aberrations in the maximum telephoto state of the second embodiment;

FIGS. 11A to 11D are graphs showing various aberrations in the maximum wide-angle state of the third embodiment;

FIGS. 12A to 12D are graphs showing various aberrations in the middle focal length state of the third embodiment;

FIGS. 13A to 13D are graphs showing various aberrations in the maximum telephoto state of the third embodiment;

FIGS. 15A to 15D are graphs showing various aberrations in the maximum wide-angle state of the fourth embodiment;

FIGS. 16A to 16D are graphs showing various aberrations in the middle focal length state of the fourth embodiment;

FIGS. 17A to 17D are graphs showing various aberrations in the maximum telephoto state of the fourth embodiment;

FIGS. 19A to 19D are graphs showing various aberrations in the maximum wide-angle state of the fifth embodiment;

FIGS. 20A to 20D are graphs showing various aberrations in the middle focal length state of the fifth embodiment; and FIGS. 21A to 21D are graphs showing various aberrations in the maximum telephoto state of the fifth embodiment.

DETAILED DESCRIPTION OF THE PREFERRED EMBODIMENTS

The preferred embodiments of the present invention will be described hereinafter with reference to the accompanying drawings.

Figure 1:
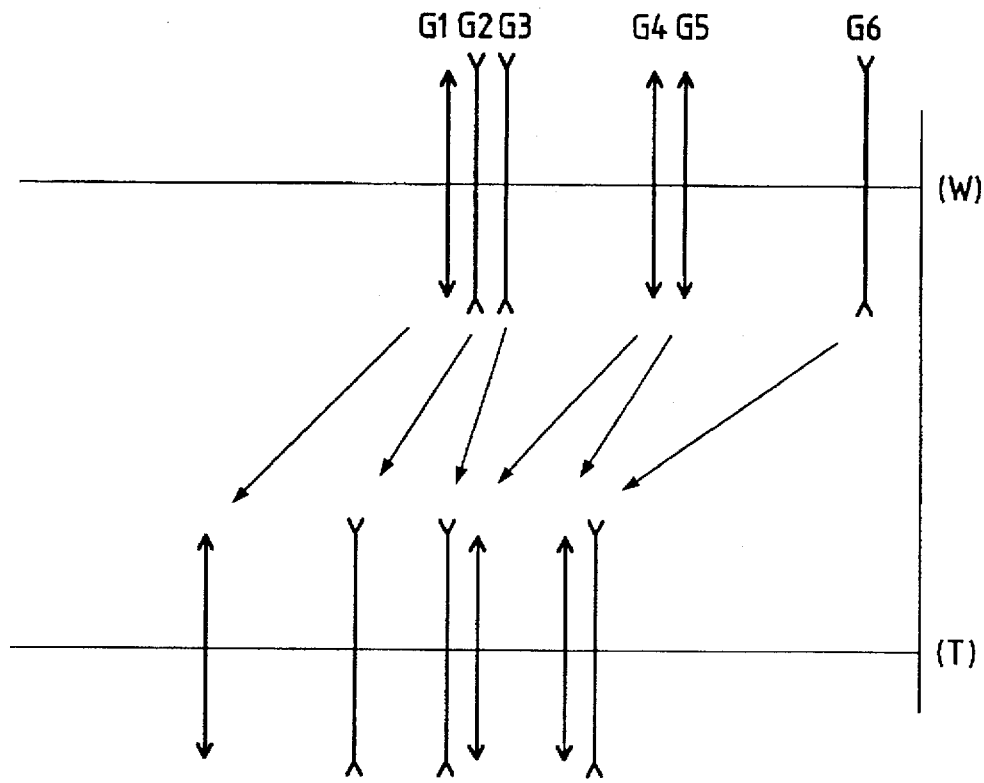
FIG. 1 is a view showing the refractive power distribution of a variable focal length optical system according to respective embodiments of the present invention, and the moving states of the respective lens units upon changing the focal length from the maximum wide-angle state to the maximum telephoto state.

FIG. 1 is a view showing the refractive power distribution of a variable focal length optical system according to the respective embodiments of the present invention, and the moving states of the respective lens units upon changing the focal length from the maximum wide-angle state (W) to the maximum telephoto state (T).

As shown in FIG. 1, a variable focal length optical system according to the respective embodiments of the present invention comprises, in the following order from the object side, a first lens unit G1 having a positive refractive power, a second lens unit G2 having a negative refractive power, a third lens unit G3 having a negative refractive power, a fourth lens unit G4 having a positive refractive power, a fifth lens unit G5 having a positive refractive power, and a sixth lens unit G6 having a negative refractive power. When the focal length of the lens system is varied from the maximum wide-angle state to the maximum telephoto state, the respective lens units move toward the object side, so that the gap between the first and second lens units G1 and G2 increases, the gap between the third and fourth lens units G3 and G4 decreases, and the gap between the fifth and sixth lens units G5 and G6 decreases.

In the respective embodiments, the second and fifth lens units G2 and G5 always move integrally during zooming so as to facilitate lens movement control, but the present invention is not limited to this.

An aspherical surface shape is expressed by formula (f) below:

$$S(y)=(y^2/R)/[1+(1-\kappa \cdot y^2/R^2)^{1/2}]+C_4 \cdot y^4+C_6 \cdot y^6+C_8 \cdot y^8+C_{10} \cdot y^{10}+ \ldots \quad (f)$$

where y is the height in a direction perpendicular to the optical axis, $S(y)$ is the displacement in the optical axis direction at the height y, R is the reference radius of curvature (radius of curvature at the apex), $\kappa$ is a coefficient of cone, and $C_n$ is an n-th order aspherical surface coefficient.

The aspherical surface in the data table of each embodiment is indicated by a mark * appended on the right side of its surface number.

[First Embodiment]

Figure 2:
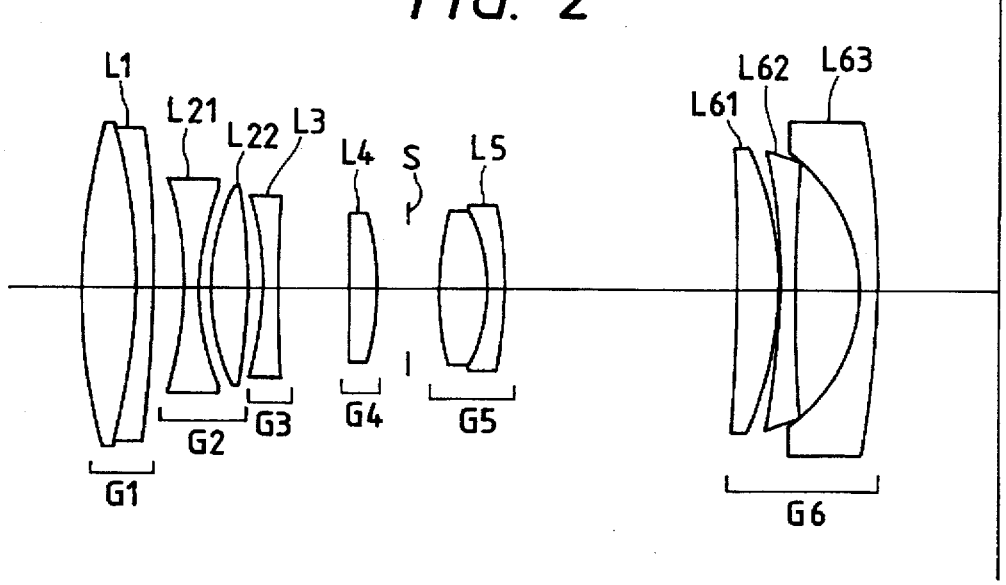
FIG. 2 is a view showing the lens arrangement of a variable focal length optical system according to a first embodiment of the present invention.

FIG. 2 is a view showing the lens arrangement of a variable focal length optical system according to the first embodiment of the present invention.

The variable focal length optical system shown in FIG. 2 is constituted by a first lens unit G1 consisting of a positive cemented lens L1 composed of a biconvex lens and a negative meniscus lens with a concave surface facing the object side, a second lens unit G2 consisting of a biconcave lens L21 and a biconvex lens L22, a third lens unit G3 consisting of a biconcave lens L3, a fourth lens unit G4 consisting of a biconvex lens L4, a fifth lens unit G5 consisting of a positive cemented lens L5 composed of a biconvex lens and a negative meniscus lens with a concave surface facing the object side, and a sixth lens unit G6 consisting of a positive meniscus lens L61 with a concave surface facing the object side, a biconcave lens L62, and a negative meniscus lens L63 with a concave surface facing the object side.

An aperture stop S is inserted between the fourth and fifth lens units G4 and G5, and moves together with the fifth lens unit G5 upon zooming from the maximum wide-angle state to the maximum telephoto state.

FIG. 2 shows the positional relationship of the respective lens units in the maximum wide-angle state, and the respective lens units move along the optical axis along zoom loci indicated by arrows in FIG. 1 when the focal length is varied toward the maximum telephoto state.

Table 1 below summarizes the data values of the first embodiment of the present invention. In Table 1, f is the focal length, FN0 is the F-number, 2ω is the field angle, and Bf is the back focus. Furthermore, the surface numbers indicate the order of lens surfaces from the object side along the propagation direction of light rays, and the refractive index and Abbe's number correspond to values for the d-line (λ=587.6 nm).

TABLE 1 f = 38.62 to 75.00 to 121.24
FNO = 4.6 to 7.0 to 9.0
2ω = 59.46 to 31.27 to 19.65°

| Surface Number | Radius of Curvature | Surface Interval | Refractive Index | Abbe's Number |
| --- | --- | --- | --- | --- |
| 1 | 48.3855 | 4.250 | 1.51860 | 69.98 |
| 2 | −46.6249 | 1.250 | 1.86074 | 23.01 |
| 3 | −85.2590 | (d3 = variable) | | |
| 4 | −27.4990 | 1.125 | 1.83500 | 42.97 |
| 5 | 19.5991 | 0.875 | | |
| 6 | 17.8894 | 2.875 | 1.75520 | 27.53 |
| 7 | −37.2913 | (d7 = variable) | | |
| 8 | −22.9462 | 1.125 | 1.80420 | 46.51 |

TABLE 1-continued

| | | | | |
|---|---|---|---|---|
| 9 | 194.2802 | (d9 = variable) | | |
| 10 | 210.6413 | 2.125 | 1.51680 | 64.10 |
| 11 | −20.1050 | (d11 = variable) | | |
| 12 | ∞ | 2.250 | (aperture stop S) | |
| 13 | 22.2701 | 3.750 | 1.51860 | 69.98 |
| 14 | −14.3176 | 1.125 | 1.80458 | 25.50 |
| 15 | −35.2967 | (d15 = variable) | | |
| 16 | −924.4876 | 3.375 | 1.86074 | 23.01 |
| 17 | −26.8317 | 0.129 | | |
| 18 | −55.9965 | 1.250 | 1.83500 | 42.97 |
| 19 | 134.1184 | 4.759 | | |
| 20 | −13.5637 | 1.375 | 1.83500 | 42.97 |
| 21 | −73.8073 | (Bf) | | |

(Variable Intervals Upon Focal Length Variation)

| | | | |
|---|---|---|---|
| f | 38.6241 | 74.9954 | 121.2373 |
| d3 | 2.1250 | 12.0454 | 20.4730 |
| d7 | 1.2473 | 2.4433 | 3.2500 |
| d9 | 5.2555 | 2.8634 | 1.2500 |
| d11 | 2.4973 | 3.6933 | 4.5000 |
| d15 | 17.7619 | 10.8985 | 6.1892 |
| Bf | 9.3746 | 27.7261 | 45.5503 |

(Condition Corresponding Values)

$\beta 6t = 2.639$
$\beta 6w = 1.316$
$f1 = 74.803$
$f2 = -193.388$
$f3 = -25.460$
$f4 = 35.625$
$f5 = 38.637$
(1) $(\beta 6t/\beta 6w)/(ft/fw) = 0.639$
(2) $f1/(fw \cdot ft)^{1/2} = 1.093$
(3) $(D23T - D23W) \cdot fw/(f2 \cdot f3) = 0.016$
(4) $(D45T - D45W) \cdot fw/(f4 \cdot f5) = 0.056$ FIGS. 3A to 3D, FIGS. 4A to 4D, and FIGS. 5A to 5D are graphs showing various aberrations of the first embodiment. FIGS. 3A to 3D are graphs showing various aberrations in the maximum wide-angle state (shortest focal length state), FIGS. 4A to 4D are graphs showing various aberrations in the middle focal length state, and FIGS. 5A to 5D are graphs showing various aberrations in the maximum telephoto state (longest focal length state).

In these graphs, FN0 is the F-number, Y is the image height, and A is the field angle with respect to each image height.

In each graph showing astigmatism, a solid curve represents the sagittal image plane, and a broken curve represents the meridional image plane. Furthermore, in each graph showing spherical aberration, a broken curve represents the sine condition.

As can be seen from these graphs, in this embodiment, various aberrations are satisfactorily corrected in the respective focal length states.

[Second Embodiment]

Figure 6:
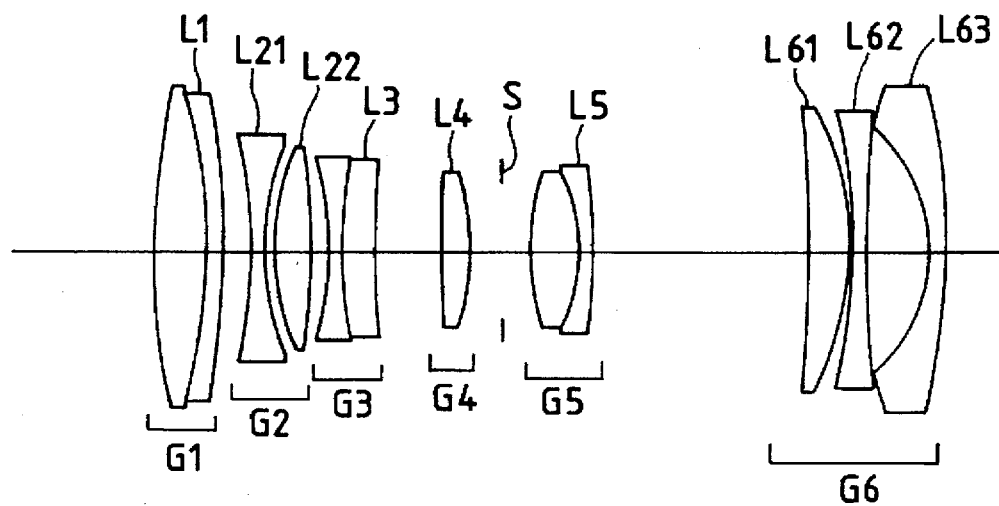
FIG. 6 is a view showing the lens arrangement of a variable focal length optical system according to a second embodiment of the present invention.

FIG. 6 is a view showing the lens arrangement of a variable focal length optical system according to the second embodiment of the present invention.

The variable focal length optical system shown in FIG. 6 is constituted by a first lens unit G1 consisting of a positive cemented lens L1 composed of a biconvex lens and a negative meniscus lens with a concave surface facing the object side, a second lens unit G2 consisting of a biconcave lens L21 and a biconvex lens L22, a third lens unit G3 consisting of a negative cemented lens L3 composed of a biconcave lens and a positive meniscus lens with a convex surface facing the object side, a fourth lens unit G4 consisting of a biconvex lens L4, a fifth lens unit G5 consisting of a positive cemented lens L5 composed of a biconvex lens and a negative meniscus lens with a concave surface facing the object side, and a sixth lens unit G6 consisting of a positive meniscus lens L61 with a concave surface facing the object side, a biconcave lens L62, and a negative meniscus lens L63 with a concave surface facing the object side.

An aperture stop S is inserted between the fourth and fifth lens units G4 and G5, and moves together with the fifth lens unit G5 upon changing the focal length from the maximum wide-angle state to the maximum telephoto state.

FIG. 6 shows the positional relationship of the respective lens units in the maximum wide-angle state, and the respective lens units move along the optical axis along zoom loci indicated by arrows in FIG. 1 when the focal length is varied toward the maximum telephoto state.

Table 2 below summarizes the data values of the second embodiment of the present invention. In Table 2, f is the focal length, FN0 is the F-number, 2ω is the field angle, and Bf is the back focus. Furthermore, the surface numbers indicate the order of lens surfaces from the object side along the propagation direction of light rays, and the refractive index and Abbe's number correspond to values for the d-line ($\lambda$=587.6 nm).

TABLE 2 f = 38.62 to 75.00 to 121.25
FNO = 4.4 to 6.8 to 9.0
2ω = 59.34 to 31.17 to 19.65°

| Surface Number | Radius of Curvature | Surface Interval | Refractive Index | Abbe's Number |
|---|---|---|---|---|
| 1 | 52.1112 | 4.250 | 1.51860 | 69.98 |
| 2 | −42.7469 | 1.250 | 1.86074 | 23.01 |
| 3 | −75.8366 | (d3 = variable) | | |
| 4 | −36.0071 | 1.125 | 1.83500 | 42.97 |
| 5 | 21.9501 | 0.875 | | |
| 6 | 18.8754 | 2.875 | 1.75520 | 27.53 |
| 7 | −48.9209 | (d7 = variable) | | |
| 8 | −22.4434 | 1.125 | 1.83500 | 42.97 |
| 9 | 51.1020 | 2.625 | 1.80518 | 25.46 |
| 10 | 167.0370 | (d10 = variable) | | |
| 11 | 149.2420 | 2.125 | 1.51680 | 64.10 |
| 12 | −20.9000 | (d12 = variable) | | |
| 13 | ∞ | 2.250 | (aperture stop S) | |
| 14 | 22.3537 | 3.750 | 1.51860 | 69.98 |
| 15 | −14.6313 | 1.125 | 1.80458 | 25.50 |
| 16 | −34.5583 | (d16 = variable) | | |
| 17 | −161.2944 | 3.375 | 1.86074 | 23.01 |
| 18 | −23.1980 | 0.208 | | |
| 19 | −45.4744 | 1.250 | 1.83500 | 42.97 |
| 20 | 154.3071 | 4.827 | | |
| 21 | −12.5815 | 1.375 | 1.83500 | 42.97 |
| 22 | −54.1832 | (Bf) | | |

(Variable Intervals Upon Focal Length Variation)

| | | | |
|---|---|---|---|
| f | 38.6248 | 75.0000 | 121.2495 |
| d3 | 2.1250 | 11.7830 | 19.1049 |
| d7 | 1.3442 | 2.5176 | 3.2500 |
| d10 | 5.0616 | 2.7148 | 1.2500 |
| d12 | 2.5942 | 3.7676 | 4.5000 |
| d16 | 16.8325 | 10.6206 | 6.4559 |
| Bf | 9.3750 | 27.1811 | 45.7793 |

(Condition Corresponding Values)

$\beta 6t = 2.808$
$\beta 6w = 1.366$
$f1 = 75.826$
$f2 = -485.875$
$f3 = -23.258$
$f4 = 35.625$
$f5 = 37.520$
(1) $(\beta 6t/\beta 6w)/(ft/fw) = 0.655$
(2) $f1/(fw \cdot ft)^{1/2} = 1.108$ TABLE 2-continued (3) (D23T − D23W) · fw/(f2 · f3) = 0.006
(4) (D45T − D45W) · fw/(f4 · f5) = 0.055

FIGS. 7A to 7D, FIGS. 8A to 8D, and FIGS. 9A to 9D are graphs showing various aberrations of the second embodiment. FIGS. 7A to 7D are graphs showing various aberrations in the maximum wide-angle state, FIGS. 8A to 8D are graphs showing various aberrations in the middle focal length state, and FIGS. 9A to 9D are graphs showing various aberrations in the maximum telephoto state.

In these graphs, FN0 is the F-number, Y is the image height, and A is the field angle with respect to each image height.

In each graph showing astigmatism, a solid curve represents the sagittal image plane, and a broken curve represents the meridional image plane. Furthermore, in each graph showing spherical aberration, a broken curve represents the sine condition.

As can be seen from these graphs, in this embodiment, various aberrations are satisfactorily corrected in the respective focal length states.

[Third Embodiment]

Figure 10:
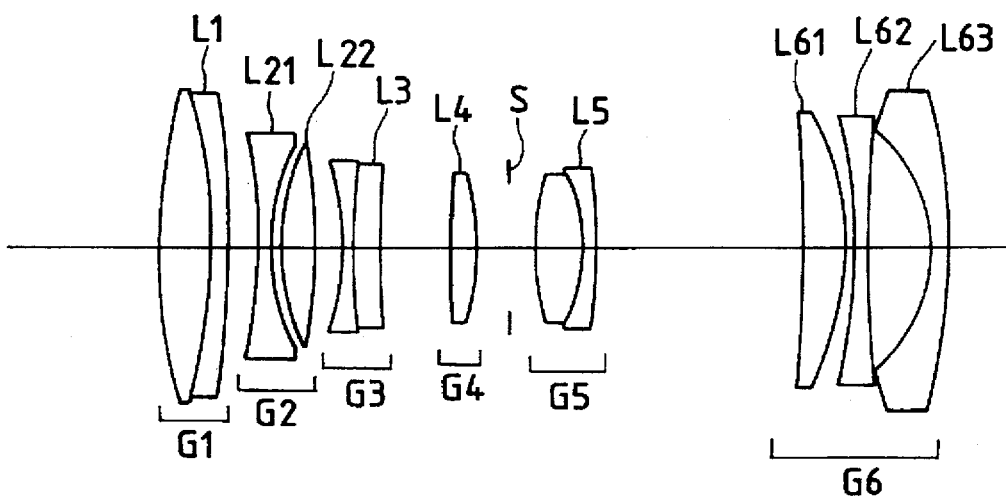
FIG. 10 is a view showing the lens arrangement of a variable focal length optical system according to a third embodiment of the present invention.

FIG. 10 is a view showing the lens arrangement of a variable focal length optical system according to the third embodiment of the present invention.

The variable focal length optical system shown in FIG. 10 is constituted by a first lens unit G1 consisting of a positive cemented lens L1 composed of a biconvex lens and a negative meniscus lens with a concave surface facing the object side, a second lens unit G2 consisting of a biconcave lens L21 and a biconvex lens L22, a third lens unit G3 consisting of a negative cemented lens L3 composed of a biconcave lens and a positive meniscus lens with a convex surface facing the object side, a fourth lens unit G4 consisting of a biconvex lens L4, a fifth lens unit G5 consisting of a positive cemented lens L5 composed of a biconvex lens and a negative meniscus lens with a concave surface facing the object side, and a sixth lens unit G6 consisting of a positive meniscus lens L61 with a concave surface facing the object side, a biconcave lens L62, and a negative meniscus lens L63 with a concave surface facing the object side.

An aperture stop S is inserted between the fourth and fifth lens units G4 and G5, and moves together with the fifth lens unit G5 upon zooming from the maximum wide-angle state to the maximum telephoto state.

FIG. 10 shows the positional relationship of the respective lens units in the maximum wide-angle state, and the respective lens units move along the optical axis along zoom loci indicated by arrows in FIG. 1 when the focal length is varied toward the maximum telephoto state.

Table 3 below summarizes the data values of the third embodiment of the present invention. In Table 3, f is the focal length, FN0 is the F-number, 2ω is the field angle, and Bf is the back focus. Furthermore, the surface numbers indicate the order of lens surfaces from the object side along the propagation direction of light rays, and the refractive index and Abbe's number correspond to values for the d-line (λ=587.6 nm).

TABLE 3 f = 38.62 to 75.00 to 121.26
FNO = 4.4 to 6.7 to 9.0
2ω = 59.31 to 31.15 to 19.63°

| Surface Number | Radius of Curvature | Surface Interval | Refractive Index | Abbe's Number |
|---|---|---|---|---|
| 1 | 52.2715 | 4.250 | 1.51860 | 69.98 |
| 2 | −42.2647 | 1.250 | 1.86074 | 23.01 |
| 3 | −76.2109 | (d3 = variable) | | |
| 4 | −41.2970 | 1.125 | 1.83500 | 42.97 |
| 5 | 18.3384 | 0.875 | | |
| 6 | 17.3788 | 2.875 | 1.75520 | 27.53 |
| 7 | −45.8149 | (d7 = variable) | | |
| 8 | −21.3641 | 1.125 | 1.83500 | 42.97 |
| 9 | 96.8785 | 2.000 | 1.80518 | 25.46 |
| 10 | 248.3984 | (d10 = variable) | | |
| 11 | 93.3423 | 2.125 | 1.51680 | 64.10 |
| 12 | −22.7568 | (d12 = variable) | | |
| 13 | ∞ | 4.500 | (aperture stop S) | |
| 14 | 25.8792 | 2.250 | 1.51860 | 69.98 |
| 15 | −13.2218 | 3.750 | 1.80458 | 25.50 |
| 16 | −27.2308 | (d16 = variable) | | |
| 17 | −121.0199 | 6.161 | 1.86074 | 23.01 |
| 18 | −22.6986 | 3.375 | | |
| 19 | −34.9180 | 0.792 | 1.83500 | 42.97 |
| 20 | 202.4224 | 1.250 | | |
| 21 | −12.6629 | 4.734 | 1.83500 | 42.97 |
| 22 | −43.6478 | (Bf) | | |

(Variable Intervals Upon Focal Length Variation)

| f | 38.6216 | 75.0034 | 121.2576 |
|---|---|---|---|
| d3 | 2.1250 | 11.6744 | 18.8249 |
| d7 | 1.9563 | 3.1258 | 3.8750 |
| d10 | 5.0874 | 2.7483 | 1.2500 |
| d12 | 2.5813 | 3.7508 | 4.5000 |
| d16 | 15.9874 | 10.0306 | 6.1617 |
| Bf | 9.3749 | 27.2374 | 45.8662 |

(Condition Corresponding Values)

β6t = 2.879
β6w = 1.393
f1 = 76.829
f2 = −616.594
f3 = −23.332
f4 = 35.625
f5 = 36.266
(1) (β6t/β6w)/(ft/fw) = 0.658
(2) f1/(fw · ft)$^{1/2}$ = 1.123
(3) (D23T − D23W) · fw/(f2 · f3) = 0.005
(4) (D45T − D45W) · fw/(f4 · f5) = 0.036

FIGS. 11A to 11D, FIGS. 12A to 12D, and FIGS. 13A to 13D are graphs showing various aberrations of the third embodiment. FIGS. 11A to 11D are graphs showing various aberrations in the maximum wide-angle state, FIGS. 12A to 12D are graphs showing various aberrations in the middle focal length state, and FIGS. 13A to 13D are graphs showing various aberrations in the maximum telephoto state.

In these graphs, FN0 is the F-number, Y is the image height, and A is the field angle with respect to each image height.

In each graph showing astigmatism, a solid curve represents the sagittal image plane, and a broken curve represents the meridional image plane. Furthermore, in each graph showing spherical aberration, a broken curve represents the sine condition.

As can be seen from these graphs, in this embodiment, various aberrations are satisfactorily corrected in the respective focal length states.

[Fourth Embodiment]

Figure 14:
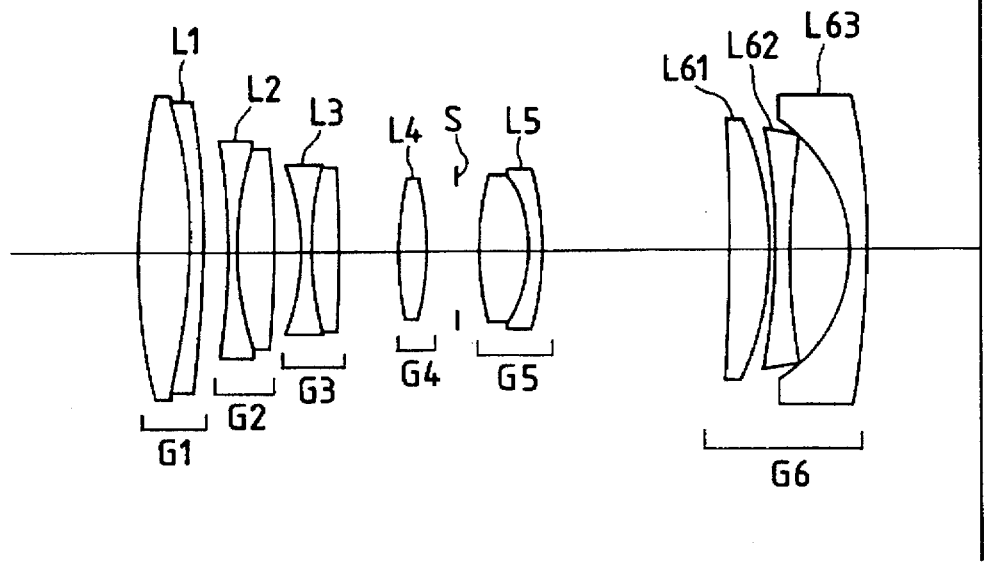
FIG. 14 is a view showing the lens arrangement of a variable focal length optical system according to a fourth embodiment of the present invention.

FIG. 14 is a view showing the lens arrangement of a variable focal length optical system according to the fourth embodiment of the present invention.

The variable focal length optical system shown in FIG. 14 is constituted by a first lens unit G1 consisting of a positive cemented lens L1 composed of a biconvex lens and a negative meniscus lens with a concave surface facing the object side, a second lens unit G2 consisting of a negative cemented lens L2 composed of a biconcave lens and a biconvex lens, a third lens unit G3 consisting of a negative cemented lens L3 composed of a biconcave lens and a biconvex lens, a fourth lens unit G4 consisting of a biconvex lens L4, a fifth lens unit G5 consisting of a positive cemented lens L5 composed of a biconvex lens and a negative meniscus lens with a concave surface facing the object side, and a sixth lens unit G6 consisting of a positive meniscus lens L61 with a concave surface facing the object side, a biconcave lens L62, and a negative meniscus lens L63 with a concave surface facing the object side.

An aperture stop S is inserted between the fourth and fifth lens units G4 and G5, and moves together with the fifth lens unit G5 upon zooming from the maximum wide-angle state to the maximum telephoto state.

FIG. 14 shows the positional relationship of the respective lens units in the maximum wide-angle state, and the respective lens units move along the optical axis along zoom loci indicated by arrows in FIG. 1 when the focal length is varied toward the maximum telephoto state.

Table 4 below summarizes the data values of the fourth embodiment of the present invention. In Table 4, f is the focal length, FN0 is the F-number, $2\omega$ is the field angle, and Bf is the back focus. Furthermore, the surface numbers indicate the order of lens surfaces from the object side along the propagation direction of light rays, and the refractive index and Abbe's number correspond to values for the d-line ($\lambda=587.6$ nm).

TABLE 4 f = 38.62 to 75.00 to 121.25
FNO = 4.3 to 6.7 to 9.0
2ω = 58.31 to 30.96 to 19.52°

| Surface Number | Radius of Curvature | Surface Interval | Refractive Index | Abbe's Number |
|---|---|---|---|---|
| 1 | 51.8054 | 4.500 | 1.51860 | 69.98 |
| 2 | -42.8058 | 1.250 | 1.86074 | 23.01 |
| 3 | -78.3256 | (d3 = variable) | | |
| 4 | -52.1558 | 1.000 | 1.83500 | 42.97 |
| 5 | 31.0425 | 3.125 | 1.75520 | 27.53 |
| 6* | -64.0262 | (d6 = variable) | | |
| 7 | -17.4521 | 1.000 | 1.83500 | 42.97 |
| 8 | 33.1222 | 2.250 | 1.78472 | 25.70 |
| 9 | -88.7007 | (d9 = variable) | | |
| 10 | 64.4199 | 2.125 | 1.51680 | 64.10 |
| 11 | -24.5642 | (d11 = variable) | | |
| 12 | ∞ | 2.250 | (aperture stop S) | |
| 13 | 32.3236 | 3.750 | 1.51860 | 69.98 |
| 14 | -12.3530 | 1.125 | 1.80458 | 25.50 |
| 15 | -24.3888 | (d15 = variable) | | |
| 16 | -232.8564 | 3.375 | 1.86074 | 23.01 |
| 17 | -24.9038 | 0.606 | | |
| 18 | -55.9723 | 1.250 | 1.80610 | 40.73 |
| 19 | 82.4071 | 4.952 | | |
| 20 | -13.1070 | 1.375 | 1.83500 | 42.97 |
| 21 | -62.3647 | (Bf) | | |

(Aspherical Surface Data)

| | κ | $C_4$ |
|---|---|---|
| 6th Surface | 1.0000 | $-1.1117 \times 10^{-5}$ |
| | $C_6$ | $C_8$ | $C_{10}$ |
| | $-1.9613 \times 10^{-7}$ | $3.5912 \times 10^{-9}$ | $-3.4259 \times 10^{-11}$ |

(Variable Intervals Upon Focal Length Variation)

| f | 38.6216 | 75.0000 | 121.2835 |
|---|---|---|---|
| d3 | 1.8750 | 11.4665 | 18.2630 |

TABLE 4-continued

| d6 | 2.0080 | 3.0822 | 3.8750 |
|---|---|---|---|
| d9 | 4.9840 | 2.8356 | 1.2500 |
| d11 | 2.6330 | 3.7072 | 4.5000 |
| d15 | 15.8165 | 9.2173 | 5.2833 |
| Bf | 9.3936 | 27.4144 | 46.5512 |

(Condition Corresponding Values)

β6t = 2.833
β6w = 1.345
f1 = 77.511
f2 = -158.376
f3 = -25.142
f4 = 34.693
f5 = 37.551
(1) (β6t/β6w)(ft/fw) = 0.671
(2) f1/(fw · ft)$^{1/2}$ = 1.133
(3) (D23T - D23W) · fw/(f2 · f3) = 0.018
(4) (D45T - D45W) · fw/(f4 · f5) = 0.111

FIGS. 15A to 15D, FIGS. 16A to 16D, and FIGS. 17A to 17D are graphs showing various aberrations of the fourth embodiment. FIGS. 15A to 15D are graphs showing various aberrations in the maximum wide-angle state, FIGS. 16A to 16D are graphs showing various aberrations in the middle focal length state, and FIGS. 17A to 17D are graphs showing various aberrations in the maximum telephoto state.

In these graphs, FN0 is the F-number, Y is the image height, and A is the field angle with respect to each image height.

In each graph showing astigmatism, a Solid curve represents the sagittal image plane, and a broken curve represents the meridional image plane. Furthermore, in each graph showing spherical aberration, a broken curve represents the sine condition.

As can be seen from these graphs, in this embodiment, various aberrations are satisfactorily corrected in the respective focal length states.

[Fifth Embodiment]

Figure 18:
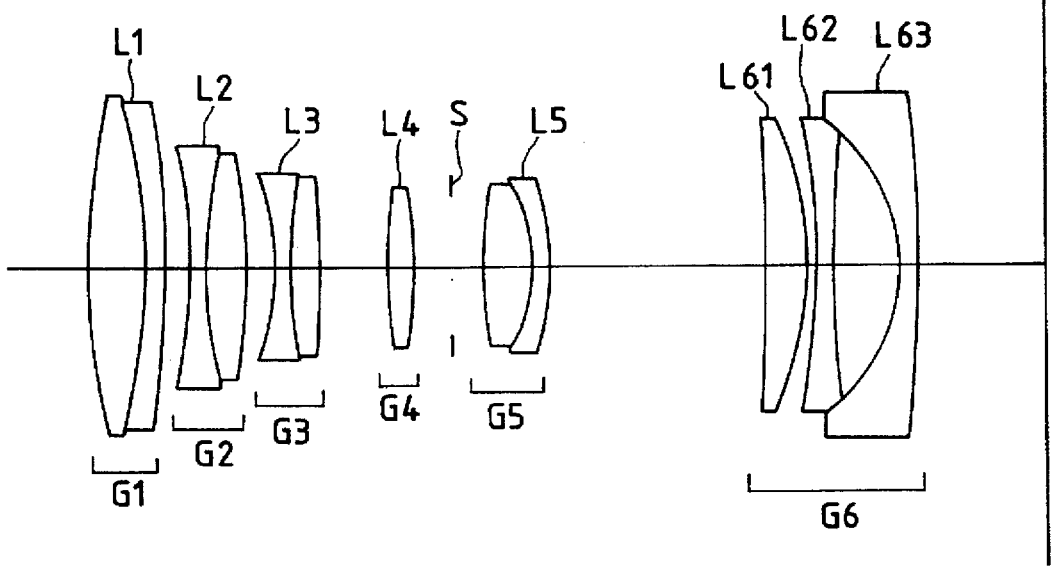
FIG. 18 is a view showing the lens arrangement of a variable focal length optical system according to a fifth embodiment of the present invention.

FIG. 18 is a view showing the lens arrangement of a variable focal length optical system according to the fifth embodiment of the present invention.

The variable focal length optical system shown in FIG. 18 is constituted by a first lens unit G1 consisting of a positive cemented lens L1 composed of a biconvex lens and a negative meniscus lens with a concave surface facing the object side, a second lens unit G2 consisting of a negative cemented lens L2 composed of a biconcave lens and a biconvex lens, a third lens unit G3 consisting of a negative cemented lens L3 composed of a biconcave lens and a biconvex lens, a fourth lens unit G4 consisting of a biconvex lens L4, a fifth lens unit G5 consisting of a positive cemented lens L5 composed of a biconvex lens and a negative meniscus lens with a concave surface facing the object side, and a sixth lens unit G6 consisting of a positive meniscus lens L61 with a concave surface facing the object side, a biconcave lens L62, and a negative meniscus lens L63 with a concave surface facing the object side.

An aperture stop S is inserted between the fourth and fifth lens units G4 and G5, and moves together with the fifth lens unit G5 upon zooming from the maximum wide-angle state to the maximum telephoto state.

FIG. 18 shows the positional relationship of the respective lens units in the maximum wide-angle state, and the respective lens units move along the optical axis along zoom loci indicated by arrows in FIG. 1 when the focal length is varied toward the maximum telephoto state.

Table 5 below summarizes the data values of the fifth embodiment of the present invention. In Table 5, f is the focal length, FN0 is the F-number, 2ω is the field angle, and Bf is the back focus. Furthermore, the surface numbers indicate the order of lens surfaces from the object side along the propagation direction of light rays, and the refractive index and Abbe's number correspond to values for the d-line (λ=587.6 nm).

TABLE 5 f = 38.62 to 75.00 to 121.25
FN0 = 4.3 to 6.7 to 9.0
2ω = 58.31 to 30.96 to 19.52°

| Surface Number | Radius of Curvature | Surface Interval | Refractive Index | Abbe's Number |
|---|---|---|---|---|
| 1 | 53.8881 | 4.500 | 1.51860 | 69.98 |
| 2 | −42.1559 | 1.250 | 1.86074 | 23.01 |
| 3 | −74.9785 | (d3 = variable) | | |
| 4 | −43.4086 | 1.000 | 1.83500 | 42.97 |
| 5 | 38.7159 | 3.125 | 1.75520 | 27.53 |
| 6* | −50.5735 | (d6 = variable) | | |
| 7 | −17.6648 | 1.000 | 1.83500 | 42.97 |
| 8 | 33.1885 | 2.250 | 1.78472 | 25.70 |
| 9 | −97.6276 | (d9 = variable) | | |
| 10 | 58.4907 | 2.125 | 1.51680 | 64.10 |
| 11 | −25.0518 | (d11 = variable) | | |
| 12 | ∞ | 2.250 | (aperture stop S) | |
| 13 | 32.8252 | 3.750 | 1.51860 | 69.98 |
| 14 | −12.1264 | 1.125 | 1.80458 | 25.50 |
| 15 | −23.6794 | (d15 = variable) | | |
| 16 | −348.2167 | 3.375 | 1.86074 | 23.01 |
| 17 | −25.6880 | 0.606 | | |
| 18 | −58.3512 | 1.250 | 1.80610 | 40.73 |
| 19 | 97.0929 | 4.952 | | |
| 20 | −13.7701 | 1.375 | 1.83500 | 42.97 |
| 21 | −115.8357 | (Bf) | | |

(Aspherical Surface Data)

| | κ | $C_4$ | |
|---|---|---|---|
| 6th Surface | 1.0000 | −1.0735 × 10$^{-5}$ | |
| | $C_6$ | $C_8$ | $C_{10}$ |
| | −1.4067 × 10$^{-7}$ | 1.7150 × 10$^{-9}$ | −1.1957 × 10$^{-11}$ |

(Variable Intervals Upon Focal Length Variation)

| f | 38.6216 | 74.6418 | 121.2835 |
|---|---|---|---|
| d3 | 1.8750 | 11.4665 | 18.2630 |
| d6 | 2.0080 | 3.0822 | 3.8750 |
| d9 | 4.9840 | 2.8356 | 1.2500 |
| d11 | 2.6330 | 3.7072 | 4.5000 |
| d15 | 15.8165 | 9.2173 | 5.2833 |
| Bf | 9.3936 | 27.4144 | 46.5512 |

(Condition Corresponding Values)

β6t = 2.812
β6w = 1.335
f1 = 77.651
f2 = −176.599
f3 = −24.948
f4 = 34.235
f5 = 38.560
(1) (β6t/β6w)/(ft/fW) = 0.671
(2) f1/(fw · ft)$^{1/2}$ = 1.135
(3) (D23T − D23W) · fw/(f2 · f3) = 0.016
(4) (D45T − D45W) · fw/(f4 · f5) = 0.109

FIGS. 19A to 19D, FIGS. 20A to 20D, and FIGS. 21A to 21D are graphs showing various aberrations of the fifth embodiment. FIGS. 19A to 19D are graphs showing various aberrations in the maximum wide-angle state, FIGS. 20A to 20D are graphs showing various aberrations in the middle focal length state, and FIGS. 21A to 21D are graphs showing various aberrations in the maximum telephoto state.

In these graphs, FN0 is the F-number, Y is the image height, and A is the field angle with respect to each image height.

In each graph showing astigmatism, a solid curve represents the sagittal image plane, and a broken curve represents the meridional image plane. Furthermore, in each graph showing spherical aberration, a broken curve represents the sine condition.

As can be seen from these graphs, in this embodiment, various aberrations are satisfactorily corrected in the respective focal length states.

In the variable focal length optical system of the present invention, a so-called anti-vibration effect can be obtained by correcting the displacement of the image position caused by, e.g., a camera shake, by appropriately moving (decentering) some lens units constituting the lens system in a direction substantially perpendicular to the optical axis.

As described above, according to the present invention, a variable focal length optical system which can attain both a high zoom ratio and high performance while achieving a size reduction can be realized.

What is claimed is:

1. A variable focal length optical system comprising, in the following order from the object side: a first lens unit G1 having a positive refractive power; a second lens unit G2 having a negative refractive power; a third lens unit G3 having a negative refractive power; a fourth lens unit G4 having a positive refractive power; a fifth lens unit G5 having a positive refractive power; and a sixth lens unit G6 having a negative refractive power, wherein at least said first and sixth lens units G1 and G6 move toward the object side when the focal length of the system is varied from a maximum wide-angle state to a maximum telephoto state in such a way that a gap between said first and second lens units G1 and G2 increases, a gap between said second and third lens units G2 and G3 varies, a gap between said third and fourth lens units G3 and G4 decreases, a gap between said fourth and fifth lens units G4 and G5 varies, and a gap between said fifth and sixth lens units G5 and G6 decreases.

2. A variable focal length optical system according to claim 1, wherein said variable focal length optical system satisfies:

$$0.4 < (\beta 6t/\beta 6w)/(ft/fw) < 0.8$$

where β6t is the lateral magnification of said sixth lens unit G6 in the maximum telephoto state, β6w is the lateral magnification of said sixth lens unit G6 in the maximum wide-angle state, fw is the focal length of the entire optical system in the maximum wide-angle state, and ft is the focal length of the entire optical system in the maximum telephoto state.

3. A variable focal length optical system according to claim 2, wherein said variable focal length optical system satisfies:

$$0.9 < f1/(fw \cdot ft)^{1/2} < 1.3$$

where f1 is the focal length of said first lens unit G1.

4. A variable focal length optical system according to claim 3, wherein said variable focal length optical system satisfies:

$$0 < (D23T-D23W) \cdot fw/(f2 \cdot f3) < 0.1$$

$$0 < (D45T-D45W) \cdot fw/(f4 \cdot f5) < 0.3$$

where D23W is the on-axis air gap between said second and third lens units G2 and G3 in the maximum wide-angle state, D23T is the on-axis air gap between said second and third lens units G2 and G3 in the maximum telephoto state, D45W is the on-axis air gap between said fourth and fifth lens units G4 and G5 in the maximum wide-angle state, D45T is the on-axis air gap between said fourth and fifth lens units G4 and G5 in the maximum telephoto state, f2 is the focal length of said second lens unit G2, f3 is the focal length of said third lens unit G3, f4 is the focal length of said fourth lens unit G4, and f5 is the focal length of said fifth lens unit G5.

5. A variable focal length optical system according to claim 1, wherein said variable focal length optical system satisfies:

$$0.9 < f1/(fw \cdot ft)^{1/2} < 1.3$$

where f1 is the focal length of said first lens unit G1, fw is the focal length of the entire optical system in the maximum wide-angle state, and ft is the focal length of the entire optical system in the maximum telephoto state.

6. A variable focal length optical system according to claim 5, wherein said variable focal length optical system satisfies:

$$0 < (D23T - D23W) \cdot fw/(f2 \cdot f3) < 0.1$$

$$0 < (D45T - D45W) \cdot fw/(f4 \cdot f5) < 0.3$$

where D23W is the on-axis air gap between said second and third lens units G2 and G3 in the maximum wide-angle state, D23T is the on-axis air gap between said second and third lens units G2 and G3 in the maximum telephoto state, D45W is the on-axis air gap between said fourth and fifth lens units G4 and G5 in the maximum wide-angle state, D45T is the on-axis air gap between said fourth and fifth lens units G4 and G5 in the maximum telephoto state, f2 is the focal length of said second lens unit G2, f3 is the focal length of said third lens unit G3, f4 is the focal length of said fourth lens unit G4, and f5 is the focal length of said fifth lens unit G5.

7. A variable focal length optical system according to claim 1, wherein said variable focal length optical system satisfies:

$$0 < (D23T - D23W) \cdot fw/(f2 \cdot f3) < 0.1$$

$$0 < (D45T - D45W) \cdot fw/(f4 \cdot f5) < 0.3$$

where D23W is the on-axis air gap between said second and third lens units G2 and G3 in the maximum wide-angle state, D23T is the on-axis air gap between said second and third lens units G2 and G3 in the maximum telephoto state, D45W is the on-axis air gap between said fourth and fifth lens units G4 and G5 in the maximum wide-angle state, D45T is the on-axis air gap between said fourth and fifth lens units G4 and G5 in the maximum telephoto state, f2 is the focal length of said second lens unit G2, f3 is the focal length of said third lens unit G3, f4 is the focal length of said fourth lens unit G4, f5 is the focal length of said fifth lens unit G5, and fw is the focal length of the entire optical system in the maximum wide-angle state.

8. A variable focal length optical system according to claim 7, wherein said second and fifth lens units G2 and G5 move integrally when the focal length of the system is varied from the maximum wide-angle state to the maximum telephoto state.

9. A variable focal length optical system according to claim 1, wherein said second and fifth lens units G2 and G5 move integrally when the focal length of the system is varied from the maximum wide-angle state to the maximum telephoto state.

10. A variable focal length optical system comprising: a negative lens unit Ga; a lens unit Gb arranged on the image side of said lens unit Ga; a lens unit Gc arranged on the image side of said lens unit Gb; and a lens unit Gd arranged on the image side of said lens unit Gc, wherein when the focal length of the system is varied from a maximum wide-angle state to a maximum telephoto state, said lens units Ga and Gd move integrally, and said lens units Gb and Gc move independently relative to said lens units Ga and Gd so as to change an air gap formed between said lens unit Gb and said lens unit Gc.

11. A variable focal length optical system according to claim 10, wherein said lens unit Ga has a negative refractive power, and said lens unit Gd has a positive refractive power.

12. A variable focal length optical system according to claim 10, wherein a lens unit G6 having a negative refractive power is arranged on the image side of said lens unit Gd.

13. A variable focal length optical system according to claim 12, wherein said lens unit Gd has a negative refractive power and wherein a synthetic focal length of said lens units Ga to Gd is positive throughout the variable focal length range with the synthetic focal length of said lens units Ga to Gd being longer at the maximum wide-angle state than at the maximum telephoto state.

14. A variable focal length optical system comprising, in the following order from the object side: a first lens unit G1 having a positive refractive power; a second lens unit G2 having a negative refractive power; a third lens unit G3; a fourth lens unit G4; a fifth lens unit G5 having a positive refractive power; and a sixth lens unit G6 having a negative refractive power, wherein at least said first and sixth lens units G1 and G6 move toward the object side when the focal length of the system is varied from a maximum wide-angle state to a maximum telephoto state in such a way that a gap between said first and second lens units G1 and G2 increases, a gap between said third and fourth lens units G3 and G4 decreases, and a gap between said fifth and sixth lens units G5 and G6 decreases, and wherein said variable focal length optical system satisfies:

$$0.4 < (\beta 6t/\beta 6w)/(ft/fw) < 0.8$$

where $\beta 6t$ is the lateral magnification of said sixth lens unit G6 in the maximum telephoto state, $\beta 6w$ is the lateral magnification of said sixth lens unit G6 in the maximum wide-angle state, fw is the focal length of the entire optical system in the maximum wide-angle state, and ft is the focal length of the entire optical system in the maximum telephoto state.

15. A variable focal length optical system according to claim 14, wherein said variable focal length optical system satisfies:

$$0.9 < f1/(fw \cdot ft)^{1/2} < 1.3$$

where f1 is the focal length of said first lens unit G1.

16. A variable focal length optical system according to claim 15, wherein said second and fifth lens units G2 and G5 move integrally when the focal length of the system is varied from the maximum wide-angle state to the maximum telephoto state.

17. A variable focal length optical system comprising: a lens unit Ga; a lens unit Gb arranged on the image side of said lens unit Ga such that there is an uninterrupted air gap between the lens units Ga and Gb; a lens unit Gc arranged on the image side of said lens unit Gb; and a lens unit Gd arranged on the image side of said lens unit Gc, wherein when the focal length of the system is varied from a maximum wide-angle state to a maximum telephoto state, said lens units Ga and Gd move integrally, and said lens units Gb and Gc move independently relative to said lens units Ga and Gd so as to change an air gap formed between said lens unit Gb and said lens unit Gc.

* * * * *